US010193844B1

(12) United States Patent
Conley et al.

(10) Patent No.: US 10,193,844 B1
(45) Date of Patent: Jan. 29, 2019

(54) SECURE CLOUD-BASED MESSAGING AND STORAGE

(71) Applicant: Amazon Technologies, Inc., Seattle, WA (US)

(72) Inventors: Myles Conley, Seattle, WA (US); Jesper Mikael Johansson, Redmond, WA (US); Srikanth Mantha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 14/967,100

(22) Filed: Dec. 11, 2015

(51) Int. Cl.
*H04L 12/58* (2006.01)
*G06Q 10/10* (2012.01)

(52) U.S. Cl.
CPC ........... *H04L 51/18* (2013.01); *G06Q 10/107* (2013.01); *H04L 51/063* (2013.01); *H04L 51/12* (2013.01); *H04L 51/14* (2013.01); *H04L 51/24* (2013.01); *H04L 51/28* (2013.01)

(58) Field of Classification Search
CPC ....... G06Q 10/107; H04L 51/00; H04L 51/06; H04L 51/063; H04L 51/066; H04L 51/12; H04L 51/14; H04L 51/18; H04L 51/22; H04L 51/24; H04L 51/28
See application file for complete search history.

(56) References Cited

U.S. PATENT DOCUMENTS

| | | | | |
|---|---|---|---|---|
| 6,442,600 B1 * | 8/2002 | Anderson | H04L 51/24 | 709/217 |
| 6,721,784 B1 * | 4/2004 | Leonard | H04L 51/18 | 709/204 |
| 7,162,738 B2 * | 1/2007 | Dickinson, III | H04L 51/12 | 380/282 |
| 7,454,778 B2 * | 11/2008 | Pearson | H04L 51/12 | 726/1 |
| 8,001,609 B1 * | 8/2011 | Chan | G06Q 10/107 | 707/609 |
| 8,112,482 B1 * | 2/2012 | Geddes | G06Q 10/107 | 709/206 |
| 8,832,049 B2 * | 9/2014 | Gillette | H04L 63/10 | 707/694 |
| 8,935,768 B1 * | 1/2015 | Tyree | G06F 21/6227 | 706/12 |

(Continued)

*Primary Examiner* — Vivek Srivastava
*Assistant Examiner* — William C McBeth
(74) *Attorney, Agent, or Firm* — Athorus, PLLC

(57) ABSTRACT

A secure messaging system identifies sensitive or restricted content within electronic messages such as E-mail, SMS or MMS text messages, or social network messages, and stores files including such content in a secure folder or bucket. After a first electronic message is identified as including sensitive or restricted content, a file including the sensitive or restricted content is stored in the secure folder or bucket, and a second electronic message including a link to the file or the secure folder or bucket is sent to each of the intended recipients of the first electronic message. When a recipient selects the link, the sensitive or restricted content is provided to the recipient over a secure connection (e.g., an SSL connection) rather than via E-mail. Additionally, recipients of the second electronic message may be authenticated by any method, e.g., an access policy and/or a single or multi-level authentication process.

11 Claims, 19 Drawing Sheets

(56) References Cited

U.S. PATENT DOCUMENTS

| | | | | |
|---|---|---|---|---|
| 2007/0100950 | A1* | 5/2007 | Bornstein | G06Q 10/107 709/206 |
| 2007/0180033 | A1* | 8/2007 | Singh | G06Q 10/107 709/206 |
| 2008/0104712 | A1* | 5/2008 | Oliver | G06F 21/6227 726/27 |
| 2009/0216678 | A1* | 8/2009 | May | G06Q 10/06 705/50 |
| 2012/0179762 | A1* | 7/2012 | Arora | G06Q 10/107 709/206 |
| 2012/0265828 | A1* | 10/2012 | Slepinin | H04L 63/0428 709/206 |
| 2013/0074194 | A1* | 3/2013 | White | H04L 51/24 726/28 |
| 2013/0103944 | A1 | 4/2013 | Adams et al. | |
| 2014/0020047 | A1* | 1/2014 | Liebmann | H04L 63/20 726/1 |
| 2014/0041006 | A1* | 2/2014 | Allen | G06Q 10/107 726/7 |
| 2014/0074947 | A1* | 3/2014 | Piazza | H04L 51/28 709/206 |
| 2015/0149560 | A1* | 5/2015 | Lee | H04L 51/066 709/206 |

* cited by examiner

| NO. NAME E-mail | LIST 1 | 2 | 3 | 4 |
|---|---|---|---|---|
| 4 Tyler, L. ltyler@rentsch.org | Y | Y | N | N |
| 6 Howard, J. jhoward@rentsch.org | N | Y | N | N |
| 7 Dwayne, G. gdwayne@rentsch.org | N | N | Y | N |
| 10 Zach, F fzach@rentsch.org | Y | N | Y | N |
| 12 Cody, E. ecody@rentsch.org | Y | N | N | Y |
| 23 Todd, J. jtodd@leftpro.org | N | N | Y | N |
| 34 Brown, D dbrown@leftpro.org | N | Y | N | N |
| 60 Erik, K. kerik@rentsch.org | N | N | N | Y |
| 82 Smith, M. msmith@rentsch.org | N | N | Y | N |

SECURE CLOUD-BASED MESSAGING AND STORAGE

BACKGROUND

Distribution lists for electronic messages (such as electronic mail, or E-mail) are sets of contact paths (e.g., E-mail addresses, telephone numbers configured for receiving text messages or social network user names) corresponding to one or more accounts that may be represented or identified by a single contact path. For example, many E-mail systems or clients permit users to manually establish a distribution list by selecting an E-mail address for the distribution list and entering identifying information such as names and E-mail addresses for one or more members. Thus, when a user intends to send an electronic message to each of the members of a distribution list, the user may simply type an address corresponding to the list as a whole, and send the electronic message to that address. Subsequently, once an electronic message is received by a server (e.g., an E-mail server) associated with a distribution list, the electronic message will be routed to each of the members of the distribution list. Information regarding members of a distribution list may be stored in association with the E-mail address for the distribution list, and any messages sent to the E-mail address will be routed to each of the members of the distribution list.

Despite their inherent efficiency, the use of distribution lists, e.g., E-mail lists, has a number of accompanying drawbacks. First, once a distribution list is created, the membership or qualifications of each of the members of the distribution list must be monitored to ensure that each of the members may continue to receive information associated with a topic, a subject or a reason for which the distribution list is created. For example, in a workplace environment, an E-mail distribution list may include personnel involved on a certain project, or personnel having a specific level of security clearance or authorization. If a distribution list is not updated to reflect changes in personnel involved on the project, or changes in their respective levels of security clearance or authorization, then an E-mail sent to a distribution list (which is sometimes called an E-mail chain) may be forwarded to personnel with neither an interest in the E-mail nor an authorization to view it. Furthermore, because many E-mail addresses are defined in a standard form based on first and/or last names of an account holder, when an E-mail address that is associated with a distribution list is assigned to a different person, that person may inadvertently receive E-mails sent to the distribution list, and access or view content included in such E-mails, if aspects of the membership of the distribution list are not regularly monitored for accuracy. For example, if a person who is named Charles Johnson and works at Acme Corporation is assigned an E-mail address of cjohnson@acmecorp.org, and is made a member of a distribution list, others who are assigned that E-mail address in the future, e.g., persons named Catherine Johnson or Charles Johnsonville, will receive E-mails that are sent to the distribution list if the membership of the distribution list is not frequently updated.

Moreover, many electronic communications formats, including but not limited to E-mail, have inherent security limitations. For example, an E-mail message generated by a user of an E-mail client application operating on a computing device is commonly transmitted to one or more E-mail agents and/or servers (e.g., an outgoing and/or an incoming E-mail server, and/or one or more agents operating thereon) before ultimately being transmitted to an E-mail client application of a user for whom the E-mail message is intended. The content of the E-mail may thus pass between and among multiple computing devices, and along multiple connections, any of which may be subject to hacking or theft via one or more surreptitious means. Furthermore, once an E-mail message is transmitted from a sender to a recipient, the E-mail message is downloaded to an E-mail client operated by the recipient, and the recipient may, either intentionally or inadvertently, forward the E-mail message to one or more other recipients who may or may not be authorized to view the content of the E-mail message.

DETAILED DESCRIPTION

Figure 1A:
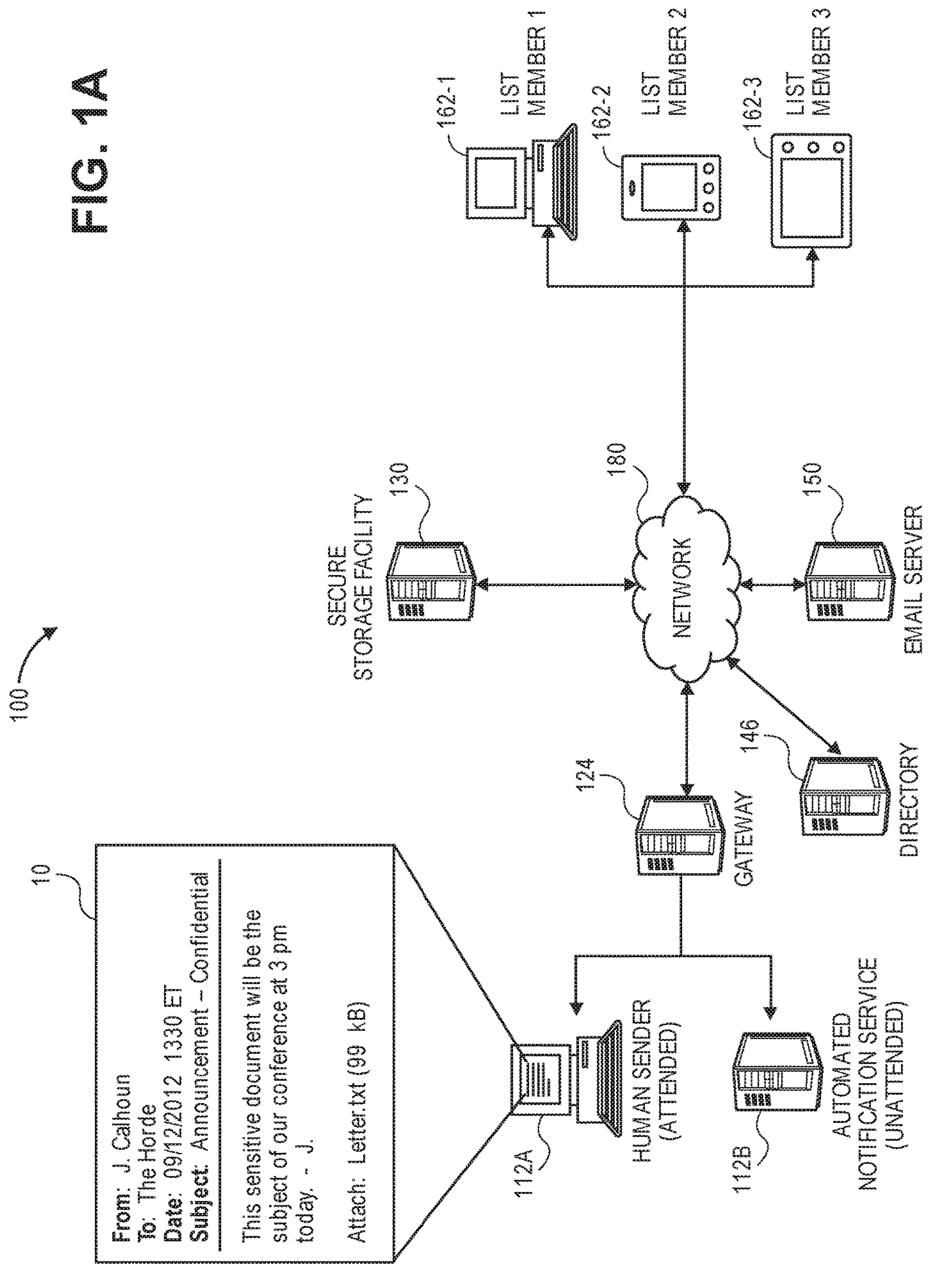
FIGS. 1A through 1D are views of aspects of one system for secure messaging in accordance with embodiments of the present disclosure.

As is set forth in greater detail below, the present disclosure is directed to secure messaging. More specifically, the systems and methods disclosed herein are directed to identifying messages intended for delivery to members of distribution lists (or access lists or secure lists), evaluating the contents of such messages against access-based standards or metrics, storing messages having contents which satisfy such standards or metrics in predetermined folders or spaces (e.g., buckets) in one or more data stores, and transmitting notices to the members of the distribution lists, with such notices including active hyperlinks or other identifiers (e.g., Uniform Resource Locators ("URL") or Uniform Resource Identifiers ("URI")) for such folders or spaces. When a member of the distribution list receives such a notice, the member may activate the hyperlinks or other identifiers. If the member is authorized to receive the contents of a message associated with the notice, such contents may be returned to the member over the network. The systems and methods of the present disclosure may thus enhance the security of messaging techniques and procedures by providing a gateway that determines a level of security or access associated with content of a message, and a level of qualification of one or more members of a distribution list, or a basis for storing the message in a bucket, and notifies such members that the message is stored in the bucket while making content of the message available to the members via a secure bucket, thereby reducing the risk of loss of control over the content of the message and facilitating the manner in which access to the message is controlled. Moreover, messages or other files within a folder may be set to expire, either by default or in a customized manner, at a predetermined time or after a predetermined duration, and be automatically deleted at the predetermined time or after the predetermined duration.

Referring to FIGS. 1A through 1D, a system 100 for secure messaging in accordance with embodiments of the present disclosure is shown. The system 100 includes a computing device 112A associated with a human sender (e.g., an attended system for transmitting electronic messages), a computing device 112B associated with an automated notification service (e.g., an unattended system for transmitting electronic messages) a gateway module 124, a secure storage facility 130, a directory 146, an E-mail server 150 and a plurality of computing devices 162-1, 162-2, 162-3 associated with members of a distribution list connected to another across a network 180, such as the Internet.

As is shown in FIG. 1A, a human sender, utilizing a messaging client installed on the computing device 112A, may generate an electronic message 10 and address the electronic message 10 to one or more recipients, including but not limited to an address (e.g., an alias) associated with a distribution list. For example, the human sender may send the electronic message 10 to an E-mail address of an intended recipient directly, e.g., by typing or entering a user name and domain name of the E-mail address into a text box on the messaging client. Alternatively, the human sender may type or enter an identifier of an intended recipient (e.g., a last name, a first name or an employee number) that may be indexed or referenced against one or more tables of data maintained in the directory 146, and an E-mail address for the intended recipient may be automatically identified. Furthermore, the distribution list may be defined by associating information regarding one or more recipients stored in the directory 146 with the alias, such that sending the electronic message 10 to the alias causes the electronic message 10 to be delivered to accounts or messaging clients associated with each of the recipients.

The electronic message 10 may be any type or form of document or file including but not limited to E-mail messages, calendar event messages, short messaging service or multimedia messaging service (SMS or MMS) text messages, instant messages, bulletin board system (BBS) messages, or the like. Those of ordinary skill in the pertinent arts will recognize that the messaging client provided on the computing device 112A may include one or more independent or web-based applications that may feature any type of text or data entry features enabling the sender to enter, edit or save content, e.g., word processors or like applications. Additionally, those of ordinary skill in the pertinent arts will further recognize that the computing device 112B may automatically generate one or more electronic messages, e.g., a trouble ticket or issue report, and direct the electronic message to one or more recipients, or to an alias of a distribution list. The electronic message 10 generated by the sender may comprise text, embedded images or other multimedia, and/or one or more attachments. The contents of the electronic message 10, including but not limited to the text or the multimedia and the various attachments, may be downloaded or viewed using one or more applications, such as a messaging client, that may be installed on one or more of the computing devices 162-1, 162-2, 162-3. In some embodiments, the electronic message 10 may include one or more Multi-Purpose Internet Mail Extensions (MIME) parts, each of which may identify or connote various components of the electronic message 10. For instance, the electronic message 10 may include a MIME part for plain text, a MIME part for a non-textual attachment, and a MIME part for header information. Alternatively, electronic messages that are automatically generated by the computing device 112B may also include MIME parts, or may be of a different format.

After the sender generates and transmits the electronic message 10 from the computing device 112A, the electronic message 10 may be received by the gateway module 124. The gateway module 124 may be a software application operating on one or more E-mail servers 150, e.g., in association with a mail submission agent thereon, or a general-purpose or special-purpose component operating in connection with the E-mail server 150. For example, the electronic message 10 may be an E-mail received by an outgoing mail server utilizing a Simple Mail Transfer Protocol (SMTP), which may, in turn, provide the electronic message 10 to a Domain Name System (DNS) server configured to translate a domain specified in an E-mail address (e.g., example.com) for a recipient into an Internet Protocol (IP) address. Next, the outgoing mail server may identify the one or more messaging service servers associated with the E-mail address, and transmit the electronic message 10 to such servers for distribution to the recipient, e.g., via a protocol such as the Post Office Protocol (POP) format or Internet Message Access Protocol (IMAP). Alternatively, electronic messages originating at the computing device 112B may be automatically generated by one or more agents operating according to one or more different protocols, including but not limited to the Simple Network Management Protocol (SNMP).

The gateway module 124 may be configured to evaluate the content of the electronic message 10 to determine whether the electronic message 10 satisfied one or more access-based standards or metrics. For example, the gateway module 124 may be configured to tag, flag or otherwise designate an electronic message based on one or more keywords (e.g., keywords that are specifically defined as relevant or important, or keywords that are generally self-evident such as "confidential," "privileged," "secret" or one or more known examples of profanity) appearing anywhere throughout the message, e.g., in a subject, in a body, in a header, or in an attachment to the message. The gateway module 124 may be further configured to tag, flag or designate electronic messages that are generated by specific senders, or intended for delivery to specific recipients, or electronic messages that are transmitted at specific times or from computing devices in specific locations (e.g., buckets) or having specific IP addresses. In other embodiments, a sender may manually tag, flag or designate a message, e.g., by interacting with a button, a check box or any other feature associated with a client application, which may be provided by the client application as a standard feature, or added to the client application as an optional feature or a plug-in feature, e.g., from one or more third parties.

Figure 1B:
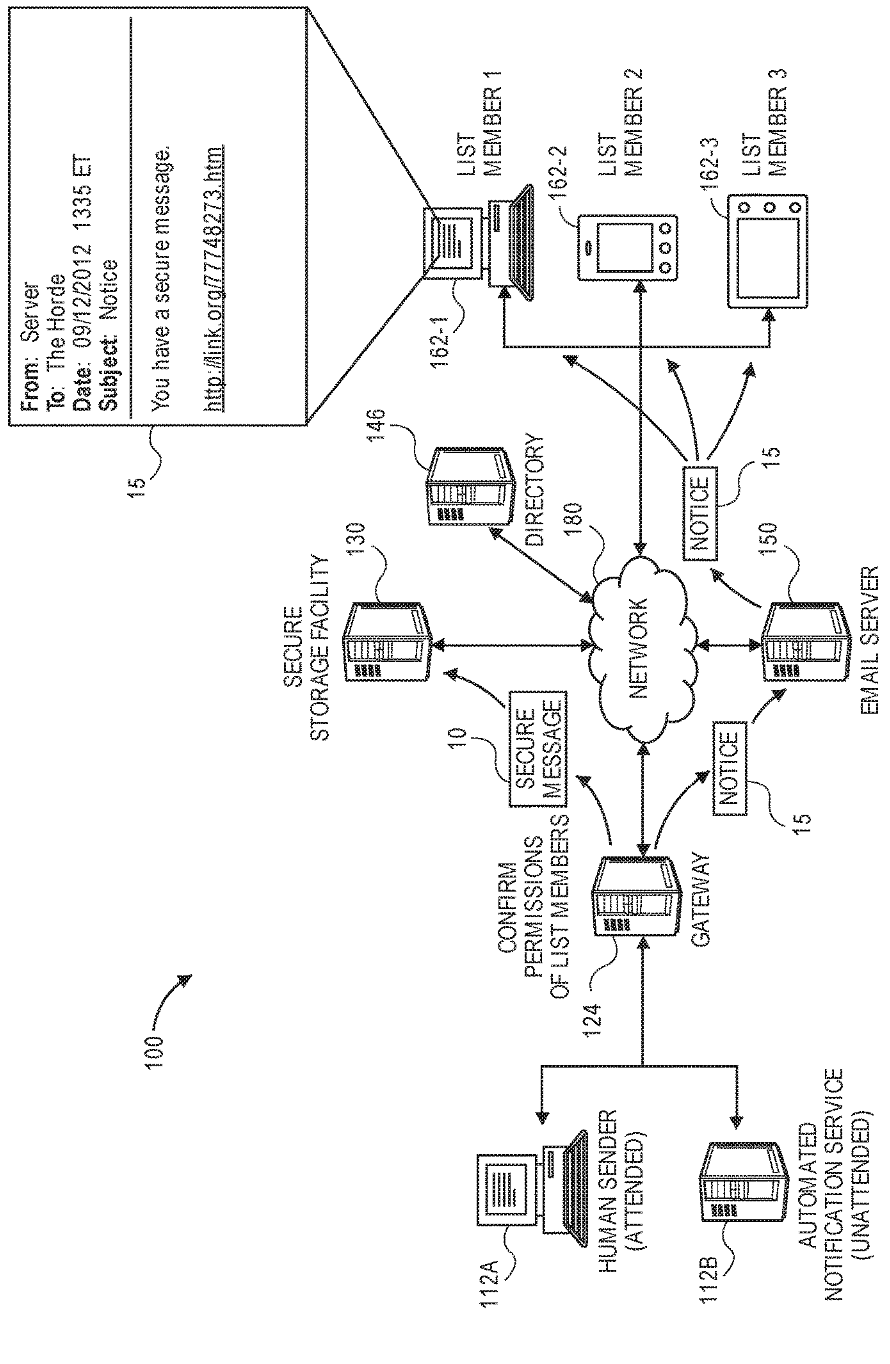

As is shown in FIG. 1B, when the gateway module 124 determines that the electronic message 10 is to be securely handled, e.g., based on its content and/or other traits or characteristics associated with a sender and/or one or more recipients, including the one or members of a distribution list, the electronic message 10 may be transferred to the secure storage facility 130 for storage, and a notice 15 (e.g., another electronic message) is transmitted from the E-mail server 150 to the computer devices 162-1, 162-2, 162-3 of the members of the distribution list. The notice 15 indicates that the electronic message 10 is available in a secure bucket within the secure storage facility 130, and may be accessed by selecting a hyperlink to that bucket. In some embodiments, the notice 15 may be an organically generated message that bears no relation to the electronic message 10 in either structure, format or content, e.g., the notice 15 need not be a redacted version of the electronic message 10. Additionally, the notice 15 also may be, but need not be, an E-mail message. For example, in some embodiments, the notice 15 may be sent via SMS or MMS text message, or via a social network message (e.g., via a Facebook® post or message, a Twitter® Tweet® or direct message, or a Google® Hangout™ message), instant message (e.g., Whatsapp®, Snapchat®), a Rich Site Summary (RSS) protocol, or by one or more servers or other computing devices, and the notice 15 may include a hyperlink to the bucket in which the electronic message 10 is stored, or to the electronic message 10 itself.

In some embodiments, users may designate a preferred contact path at which they would like to receive the notice 15. For example, some users may prefer to receive the notice 15 in the form of an E-mail message, e.g., via an E-mail client. Other users may prefer to receive the notice 15 via an SMS or MMS message to a preferred telephone number, a social network message to a preferred account, or an instant message to a preferred user name. Furthermore, prior to transmitting the notice 15 to each of the computing devices 162-1, 162-2, 162-3, the E-mail server 150 may validate and/or confirm that each of the members of the distribution list has permission (e.g., remains authorized) to receive the electronic message 10 through one or more authentication techniques, such as a multifactor authentication system or method that considers and evaluates multiple independent credentials received from each of the respective members.

Figure 1C:
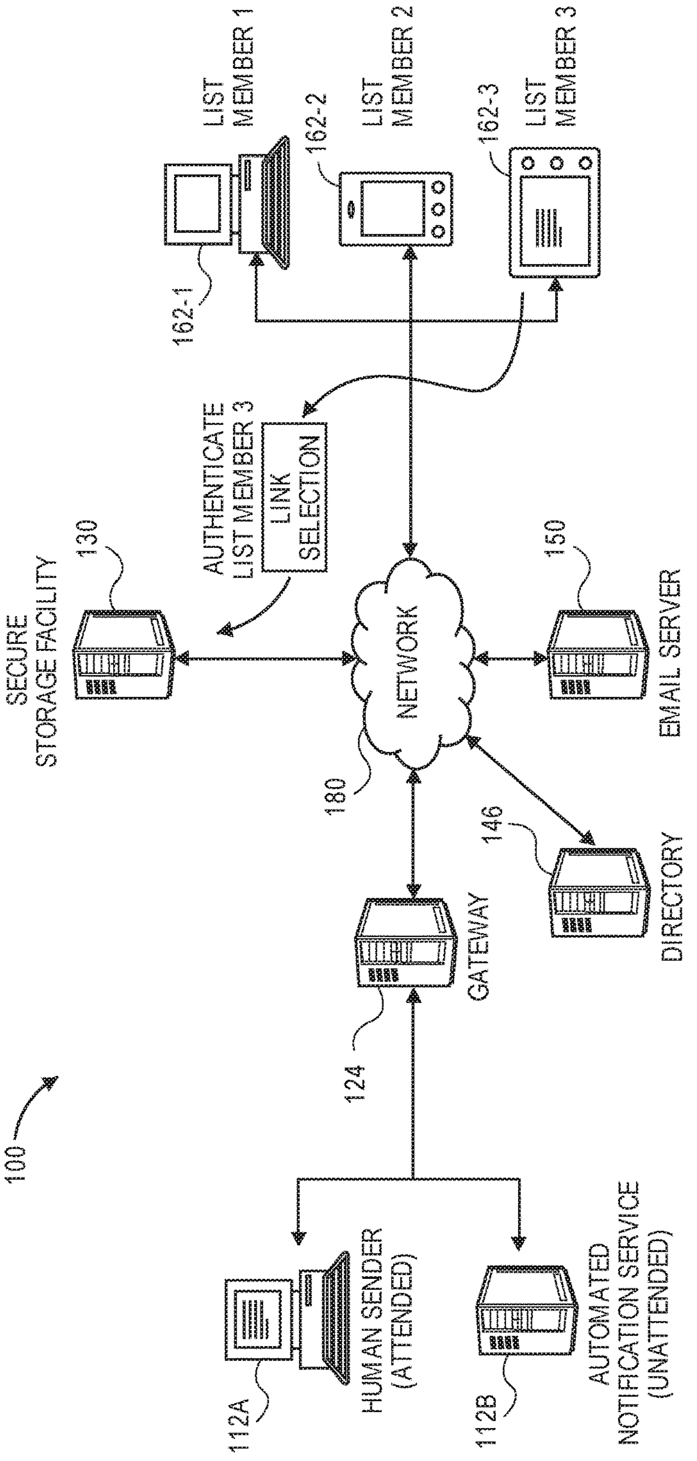
Figure 1D:
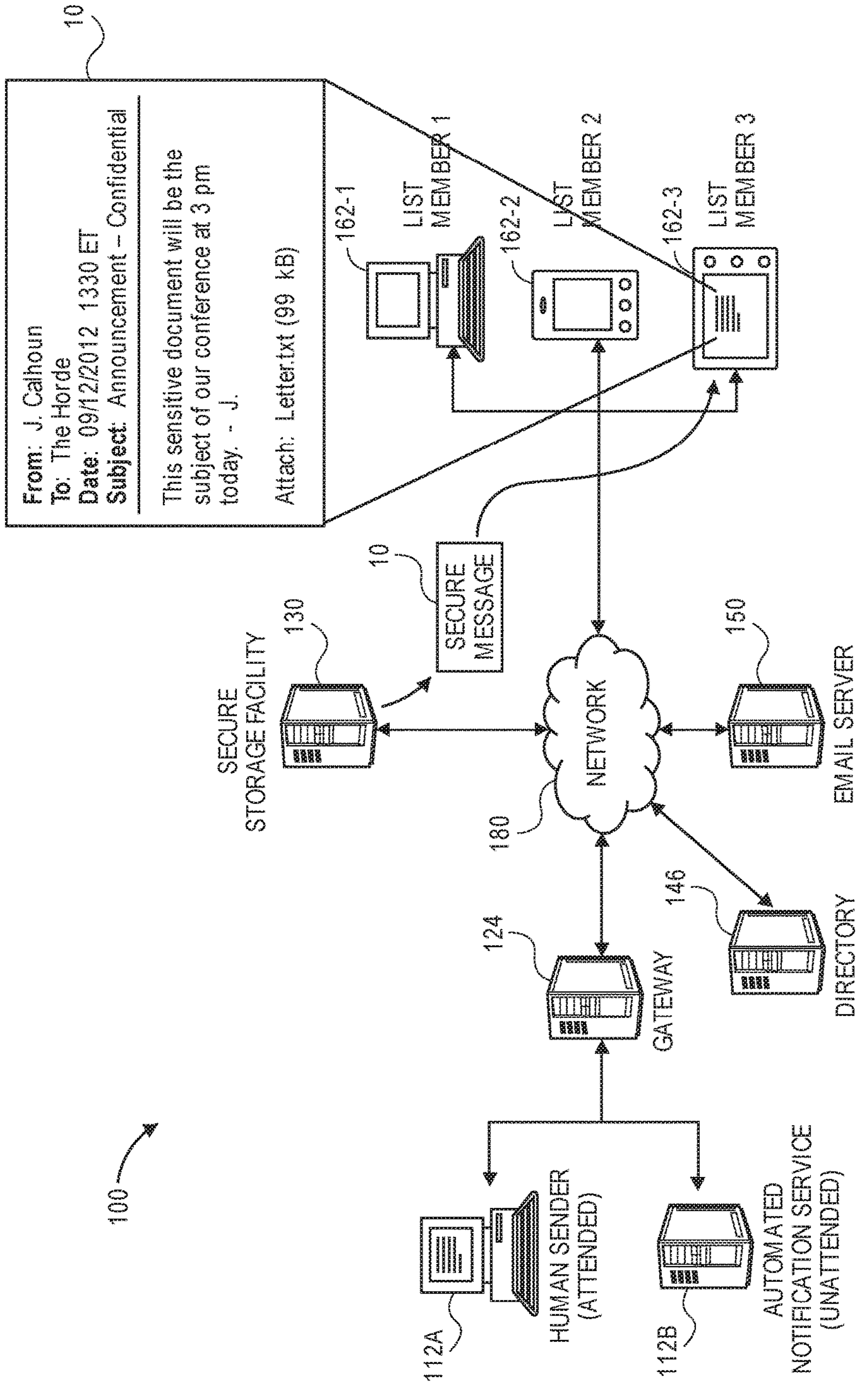

Upon receiving the notice 15, one or more of the users of the computing devices 162-1, 162-2, 162-3 may select or otherwise activate the hyperlink to the bucket in which the electronic message 10 is stored. As is shown in FIG. 1C, upon receiving the selection of the hyperlink from the user of the computing device 162-3, the secure storage facility 130 may authenticate the user, e.g., based on the IP address of the computing device 162-3, any cookies or trackers on the computing device 162-3, or by any other authentication techniques, such as by mapping the computing device 162-3 or an E-mail address to which the notice was sent to the user. Any number of restrictions, procedural steps or conditions precedent for accessing content stored within the bucket may be implemented by a generator of the distribution list or an operator of the secure storage facility 130. As is shown in FIG. 1D, after the user of the computing device 162-3 has been authenticated, and has satisfied any relevant restrictions or conditions, the secure storage facility 130 transfers the electronic message 10 to the computing device 162-3 via a secure and/or encrypted connection, such as a Secure Sockets Layer (SSL) connection, without having to transfer the electronic message 10 over one or more E-mail servers, such as the E-mail server 150. If the members of the distribution list do not activate the hyperlinks within the notice 15 by a predetermined time, or after a predetermined duration, the message 10 may be allowed to expire, or may be automatically deleted or otherwise processed in accordance with any relevant distribution procedures.

Accordingly, the systems and methods of the present disclosure are directed to secure messaging that replaces the use of standard E-mail servers or other messaging servers for the communication or storage of sensitive messages and their content, or the transmission of sensitive messages to members of distribution lists. By depositing qualifying messages or content, such as the electronic message 10 of FIG. 1A, into a secure bucket maintained in at least one data store, and enabling authorized users to access such content by selecting or activating hyperlinks included in sanitized notice messages, such as the notice 15 of FIG. 1B, the systems and methods disclosed herein may enable the prompt, effective and secure communication of sensitive messages and/or their content in a manner that minimizes or avoids the use of E-mail servers or like components, and transfers such messages and content to users via more secure channels.

In particular, an electronic message identified as containing sensitive or restricted content may be flagged and stored in a secure location, and a notice including a hyperlink to a file including the electronic message or the sensitive or restricted content, or to the secure location, may be provided to an intended recipient via a channel that need not be secure, such as E-mail, SMS or MMS text messages, RSS, or social network messages. The intended recipient may select the hyperlink and access the content of the message, or the secure location, via a secure and/or encrypted connection subject to one or more restrictions or conditions. Moreover, the content of the message may be furnished to the intended recipient in a manner that may be selected or customized on an individual basis.

Electronic messaging has evolved into a simple, effective, rapid and versatile form of electronic communication between users of computers or other like devices since the advent of the Internet. Modern messaging interfaces are able to transmit and receive electronic messages such as E-mail, SMS or MMS text messages, RSS, social network messages or any other type or form of message that includes text as well as additional files, or "attachments," and hyperlinks or "links," which are selectable, direct references to external files that may be accessed over a network. Today, electronic messages may be delivered and received by computers of any kind, including standard computers such as desktops or laptops, as well as mobile phones, tablets or other mobile devices, electronic book readers, set-top boxes, televisions or other appliances and even automobiles. According to some estimates, there are over three billion unique E-mail addresses capable of sending and receiving E-mail, and over four billion mobile devices having unique telephone numbers that are capable of sending and receiving SMS or MMS text messages, around the world. Likewise, it is estimated that an average of one hundred fifty billion E-mail messages, twenty billion SMS or MMS text messages are sent each day. Countless other messages are sent via other platforms, including messages sent via social networks and/or instant messaging systems or applications.

The sending and receiving of electronic messages have changed the way that people communicate with one another. The most common electronic message, electronic mail, or E-mail, typically comprises a set of text that may be generated at one application operating on a machine on behalf of the sender of the E-mail (sometimes called a "mail user agent" or an "E-mail client"), transmitted to another machine or apparatus (e.g., an "E-mail server") that may be implicitly or explicitly designated by the sender and may be operating one or more mail processing programs or applications (sometimes called a "mail submission agent"). Once an E-mail has been received by an application operating on an E-mail server (e.g., "a mail submission agent"), the E-mail may be transferred to another E-mail server or application operating thereon (sometimes called a "mail transmission agent"), before being routed to yet another E-mail server or application (a "mail delivery agent") that may be implicitly or explicitly designated by a recipient, and then transferred to an application operating on a machine on behalf of the recipient (e.g., an E-mail client or "mail user agent"). Some common E-mail clients include applications that run on free-standing machines, such as Microsoft® Outlook®, Microsoft® Entourage®, Apple® Mail, or web sites or web applications that provide E-mail access on any machine through the Internet, such as Gmail® or Yahoo!®.

Therefore, in the delivery and receipt of an E-mail message, a first E-mail client may deliver a message generated by or on behalf of a sender to a first E-mail server designated by the sender, and the first E-mail server may then transmit the message to a second E-mail server identified in an E-mail address of a recipient. The second E-mail client may then request that the second E-mail server deliver the message on behalf of the recipient, and delete any copies therefrom. The second E-mail client may then divide the set of text included in the message into different parts (e.g., identifiers of the sender, the recipient, a subject of the message and a date on which the message was sent, as well as a body of the message), and display tags or indicators of the message and other messages, sorted in a list. Traditionally, outgoing E-mail messages are handled by a server operating according to the SMTP protocol, while incoming E-mail messages are handled by a server operating according to either the POP3 protocol or the IMAP protocol. In some embodiments, such servers may be maintained or operated by Internet Service Providers ("ISP"), web-hosting services or any other entities. Additionally, electronic mail messages may be automatically generated by one or more computing devices, e.g., in unattended processes, based on inputs received or sensed within a complex or distributed system. In some embodiments, such computing devices may be maintained or operated according to the SNMP protocol.

One advantage of E-mail and other electronic messaging systems is that unlike traditional mail, or "snail" mail, an electronic message system permits the same message to be transmitted to multiple recipients simultaneously. For example, a user of an E-mail client may enter each of the names and/or E-mail addresses of intended recipients into either a "To" box, for primary recipients, a "Cc" (or carbon copy) box, for secondary recipients, or into a "Bcc" (or blind carbon copy) box, for recipients with identities that are concealed from all but the sender. An automated notification service may also be configured to transmit electronic messages to multiple recipients.

Additionally, an E-mail message may be sent to multiple recipients using a distribution list, which is typically manually generated either by or on behalf of a user of an E-mail client, or by an operator or administrator of a centralized E-mail system, and may include E-mail addresses of users of the centralized E-mail system (e.g., an internal E-mail list), or E-mail addresses of users from two or more discrete E-mail systems. To create a distribution list, one or more members to be added to the list are identified by name, E-mail address or one or more other identifying characteristics, and an identifier of the distribution list (e.g., an alias) may be designated. Thereafter, when a user of the E-mail client or the centralized E-mail system intends to send a message to each of the members of the distribution list, the user may also enter the alias of the E-mail distribution list into either the "To," the "Cc" or the "Bcc" box, and the E-mail will be transmitted to accounts associated with each of the members of the E-mail distribution list.

Distribution lists are convenient for circulating a common message to a group of recipients, but their use may carry a number of security risks. For example, an E-mail address may typically be added to a distribution list without determining whether an owner of the E-mail address is authorized or cleared to receive messages or other content that is typically sent to members of the distribution list. A clerical error in naming a user to the distribution list (e.g., a typographical error in entering the user's E-mail address or telephone number) may also result in an unintended breach of security or an unwanted release of sensitive information every time that a message is sent to the distribution list. Moreover, if the distribution list is not properly maintained when changes are made to the membership, users may continue to receive messages and/or other content that is no longer relevant. For example, when a user who is a member of a distribution list maintained by an organization departs the organization, and his or her E-mail address is assigned to a new user, the new user will receive E-mail sent to the distribution list if the membership of the distribution list is not timely and properly maintained. Furthermore, where a distribution list maintained by an organization includes members within and without the organization, the organization effectively relinquishes control over messages and content that is disseminated via the distribution list. Finally, any of the recipients of an E-mail message sent to a distribution list may forward the E-mail message to any number of other E-mail addresses, even if such E-mail addresses are not associated with users who are authorized to receive the E-mail message or view its content.

The systems and methods of the present disclosure are directed to secure messaging services. A gateway module configured to evaluate content of a message intended for a recipient, and to determine that the message includes content that qualifies the message for storage in a predetermined file or location, e.g., a bucket, of a data store associated with a secure storage facility, or permits the message to pass through to the recipient unimpeded. A message may qualify for storage within a bucket based on a table or set of rules or restrictions that may be subjectively associated with a specific distribution list (e.g., a security setting or standard pertaining to the specific distribution list, such as "confidential," "secret" or "personnel") or objectively associated with two or more distribution lists (e.g., restrictions on profanity, pornographic content or financial information).

In some embodiments, a distribution list that is dedicated to or associated with a specific purpose may be assigned a specific bucket within the data store, and all messages or content that is determined to satisfy one or more of the rules or restrictions may be stored in the bucket. When a message or other content is stored in the bucket, a notice message (e.g., a subsequent message) may be provided to all members that are confirmed as being authorized to receive the message or other content, and the notice may include a hyperlink or other selectable feature that a member may select in order to obtain access to the bucket, or to one or more messages or other files maintained within the bucket. The link may include a unique identifier of the bucket, or of the one or more messages or other files. Alternatively, access to a bucket may be obtained in any number of other ways. For example, in some embodiments, a secure bucket may be automatically assigned or provisioned to a single electronic message, e.g., upon recognizing that the electronic message contains sensitive or restricted information, or that the electronic message otherwise qualifies for storage in a secure storage facility, and the sender and each of the intended recipients may be automatically granted access to the secure bucket. The message may be immediately diverted to the secure bucket, and a notice message identifying the secure bucket and/or the message may be automatically transmitted to each of the intended recipients. Moreover, in addition to messages sent to an associated distribution list, a bucket may receive messages or other files from any number of other sources, and members having access to the bucket may be alerted when files other than messages are added to or removed from the bucket, or when a status of the bucket has changed, via a notice message including a link to the bucket.

In some other embodiments, a mail user agent or client application may include one or more features for manually designating a message or the content therein as qualifying for a specific bucket. For example, the agent or application may include a selectable button, link or other element that, when selected by a user prior to or while preparing a message for transmission, causes the message to be automatically tagged, flagged or designated for storage in a specific bucket, or for treatment in accordance with one or more other specific handling procedures. Additionally, the specific bucket into which a message is to be stored may also be selected by the user, e.g., via a drop-down menu, a text box, or one or more other traditional procedures. Once a user selects such a feature, or otherwise tags, flags or designates the message, the message may be diverted to the secure bucket without delay, and the notice message may be generated and transmitted, e.g., by the mail user agent or client application, to each of the intended recipients of the message. The buttons, links or other elements by which a user may designate a message for storage in a bucket, or select the bucket, may be provided as standard features in the mail user agent or client application, or as an addition to the agent or application, e.g., a plug-in, provided by a third party.

In still other embodiments, where such a notice message is transmitted to a client path associated with an authorized user of a bucket, indicating that a secure message or other content has been added to the bucket, and the notice message is received at a client application operating on a secure computer device associated with the authorized user, the secure message or other content may be automatically downloaded from the bucket to a secure folder residing on the secure computer device, such as by way of a secure (e.g., access-controlled or encrypted) connection, such that the authorized user may automatically access the secure message or other content locally from his or her secure computer device. The automatic downloading may be performed immediately upon receiving the notice message, or at a regularly scheduled time, and the client application or secure computer device may be configured to securely delete the secure message or other content from the secure folder, or to wipe the contents of the secure folder, at regularly scheduled times, or after a predetermined time has lapsed since the secure message or other content was downloaded form the bucket.

In accordance with the present disclosure, contact paths (such as E-mail addresses or other electronic addresses) of a distribution list may be validated via one or more processes operating on or performed by a server (e.g., an incoming E-mail server and/or an outgoing E-mail server) and/or in association with a gateway module, or on any networked computing device associated with an E-mail server and/or gateway module. For example, where an E-mail address is selected for validation, a server and/or gateway module may generate or cause to be generated a validation link that is customized to the E-mail address, and include the validation link in an E-mail message, e.g., in an E-mail message that is already intended to be sent to the E-mail address for another purpose, or in a notification expressly intended to validate the E-mail address. In accordance with the systems and methods of the present disclosure, an E-mail server and/or a gateway module may regularly validate E-mail addresses of members, e.g., sequentially or in parallel, and at regular intervals or at randomly scheduled times, or in any other manner.

Upon receiving a message including a validation link, a recipient may log in using a user name and/or password that may be manually or automatically verified against a data table, a record or a database, e.g., in a directory, containing information regarding contact paths (e.g., E-mail addresses and/or other contact information) for the various members of the distribution list. Where the recipient is successfully validated, e.g., upon selecting the validation link, the recipient may be granted access to a secure bucket associated with the distribution list. Where the recipient is not successfully validated, however, the recipient may be denied access to the secure bucket, until the recipient is validated by one or more alternative means (e.g., by telephone or in person). In some embodiments, requests to access messages or other files stored in a secure bucket or folder may be subjected to any number of authentication procedures, access control checks, and/or mapping processes prior to granting access to the messages or other files. In accordance with the present disclosure, authentication procedures may be based on knowledge or possessions of a user (e.g., knowledge such as passwords or other credentials, or possessions such as a secure personal device or token), or inherent features (e.g., biometrics) of a user. For example, a user may be requested to provide a password or other credential to prove the user's identity, and once identified, access control parameters associated with a requested bucket may be evaluated to determine whether the identified user is sufficiently privileged to warrant access to the requested messages or files. Authentication procedures of the present disclosure may also require a single factor, or two or more factors, prior to granting access to a secure bucket or folder.

In some embodiments, a secure bucket may be configured to present one or more interfaces to users who are authorized to access the bucket. Such interfaces may permit authorized users to interact with contents of the bucket, e.g., to view any messages or other content securely provided therein, to generate responses and read or annotate any attachments to the messages or other content, without removing the messages or other content from the bucket. In this regard, after a message or other content has been stored in a secure bucket, an authorized user having a certain level of credentials may manipulate the message or other content within the secure bucket such that the message or other content that is subsequently accessed by other users (e.g., in response to a notice message) is different from the message or other content that was originally stored within the secure bucket.

Additionally, membership of a distribution list may be validated in any number of ways, other than by merely sending electronic messages having validation links to contact paths. For example, an automatic system may crawl for information provided in social networking profiles or company profiles to determine whether one or more of the members of a distribution list has changed his or her status, thereby indicating that the member has departed a company, or has a changed role within the company, based on such information. Changes in status may be determined expressly, or implicitly based on public or semi-private statements or other indicia, such as social networking posts including terms such as "my contact information has been updated" or "starting a new job today!," which may be flags indicating that a member's status may have changed.

Membership of a distribution list may also be validated in response to predefined events or externalities. For example, in some embodiments, each of the contact paths of a distribution list may be automatically evaluated in response to one or more indications of fraud or compromise, which may be assessed or ranked based on a level of confidence in the indications or a level of risk if such indications are deemed both genuine and accurate.

Figure 2A:
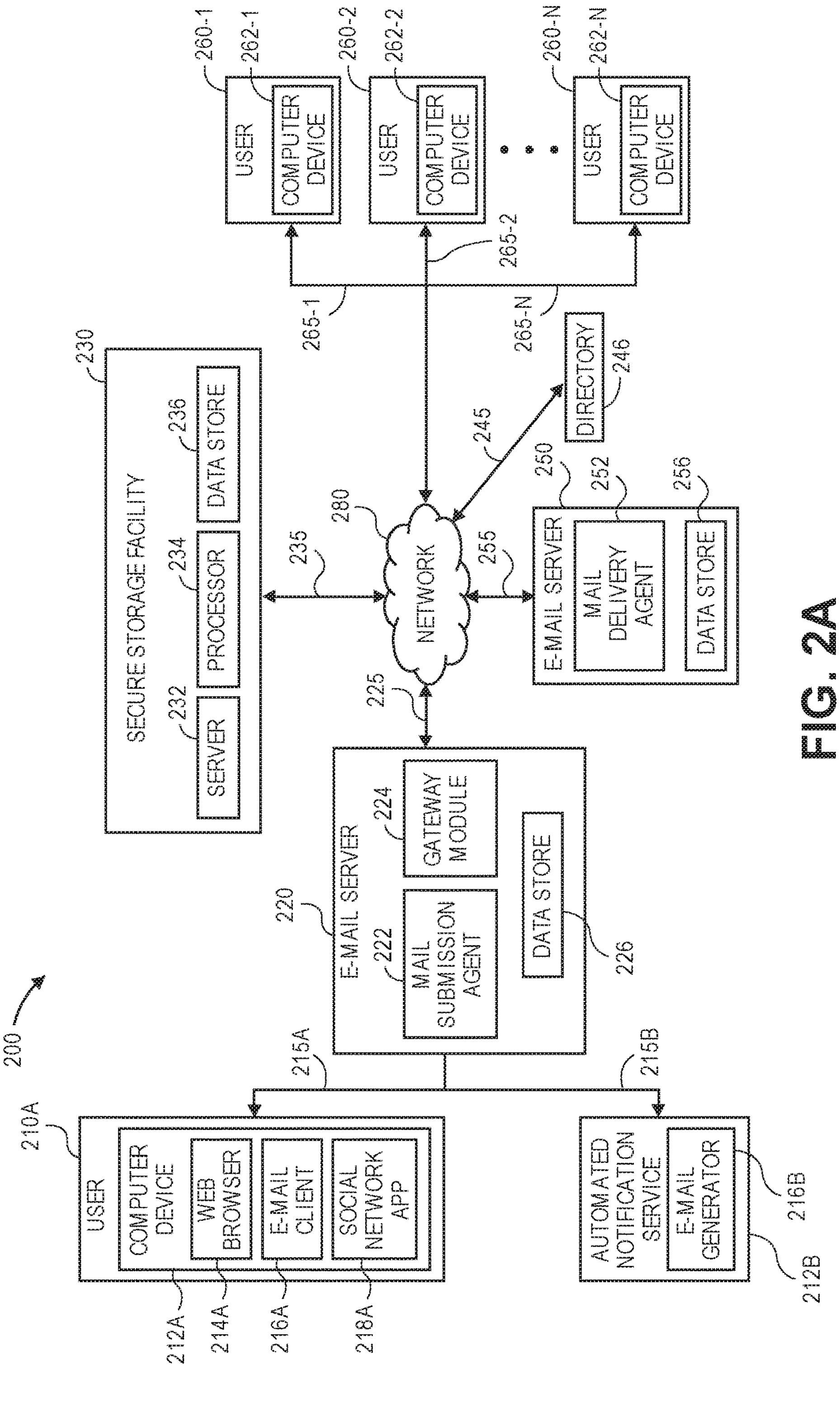
FIGS. 2A and 2B are block diagrams of components of one system for secure messaging in accordance with embodiments of the present disclosure.
Figure 2B:
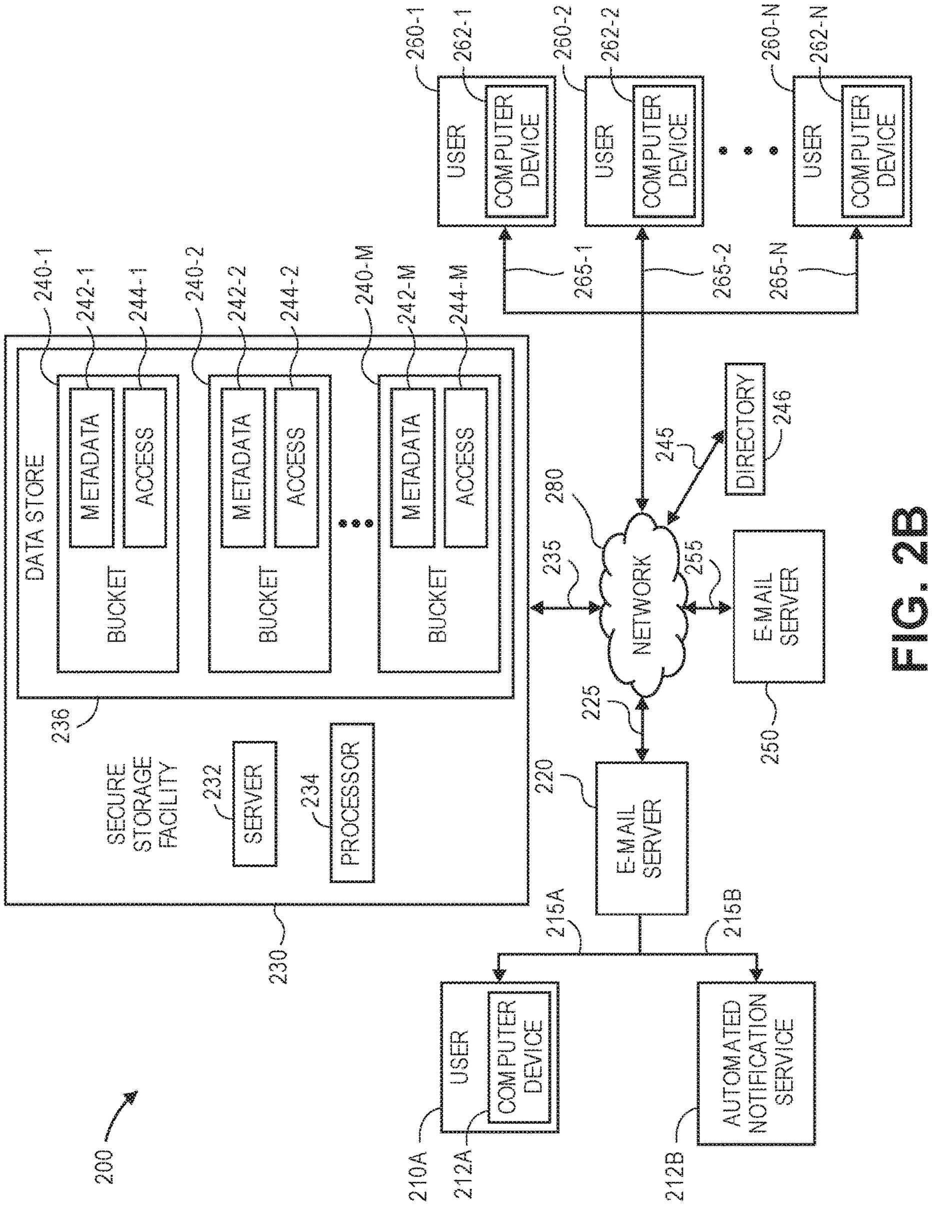

Referring to FIGS. 2A and 2B, a block diagram of one system 200 for secure messaging in accordance with embodiments of the present disclosure. The system 200 includes a user 210A (e.g., a sender of an electronic message), an automated notification service 210B, a first E-mail server 220, a secure storage facility 230, a directory 246, a second E-mail server 250 (e.g., an incoming E-mail server) and a plurality of users 260-1, 260-2 . . . **260-*n* (e.g., intended recipients of electronic messages) that are connected to one another across a network 280, such as the Internet. Except where otherwise noted, reference numerals preceded by the number "2" in FIG. 2A or FIG. 2B refer to elements that are similar to elements having reference numerals preceded by the number "1" shown in FIGS. 1A through 1**D.

As is shown in FIG. 2A, the user 210A may be any owner, operator or user of a computer device 212A, or any other like machine that may operate or access one or more software applications, such as a web browser 214A, an E-mail client 216A or a social network application 218A. For example, the computer device 212A may be or comprise a device that is specifically programmed or adapted for one or more purposes (e.g., browsing, sending or receiving E-mail or social networking) or a general purpose device such a desktop computer, a tablet computer, a laptop computer, a smartphone, a personal digital assistant, a digital media player, an electronic book reader, a set-top box, a television, an appliance or an automobile, as well as a wearable computer device such as a pair of augmented reality glasses or a wristwatch, and may include any form of input and/or output peripherals such as scanners, readers, keyboards, keypads, touchscreens or pointing devices. The computer device 212A may be connected to or otherwise communicate with a computer device 212B of the automated notification service 210B, the E-mail servers 220, 250, the secure storage facility 230 or computer devices associated with the other users 260-1, 260-2 . . . **260-*n* via the network 280, as indicated by line 215**A, by the transmission and receipt of digital data.

The browser 214A may be any application or system configured to download networked content to and/or upload networked content from one or more other computer devices, to display such networked content on one or more computer displays, and to receive one or more interactions with the networked content. The E-mail client 216A may be any application for generating, viewing, editing, transmitting, receiving and/or storing E-mail messages, and may include any additional relevant or unrelated capacities or specifications. Additionally, the E-mail client 216A may operate in conjunction with one or more other applications or systems that may, but need not, be related to the sending or receipt of E-mail, including but not limited to calendar applications, contact management applications, task management applications or any other like applications. The social network application 218A may be any application configured to interact with a social network (not shown) via the computer device 212A, e.g., over the network 280, and may include any of the functionality or features of the browser 214A and/or the E-mail client 216A.

In addition to the browser 214A, the E-mail client 216A or the social network application 218A, those of ordinary skill in the pertinent arts will recognize that the computing device 212A may operate one or more software applications including but not limited to word processing, personal management or mapping applications, or feature hardware components including but not limited to one or more sensors (e.g., a cellular telephone transceiver, a Global Positioning Service receiver, an accelerometer, a gyroscope or a compass).

The automated notification service 212B may be any system for automatically generating, transmitting, receiving or storing electronic messages, such as trouble tickets or issue reports, to one or more recipients in unattended processes. The automated notification service 210B may include or operate one or more computer devices, or reside on one or more of such devices, which may be any type of specifically programmed computer device, or any type of general computer device, and may be connected to or otherwise communicate with the computer device 212A, the E-mail servers 220, 250, the secure storage facility 230 or computer devices associated with the other users 260-1, 260-2 . . . **260-*n* via the network 280, as indicated by line 215**B, by the transmission and receipt of digital data.

The E-mail generator 216B may be any application for generating, viewing, editing, transmitting, receiving and/or storing E-mail messages, and may include any additional relevant or unrelated capacities or specifications. In some embodiments, the E-mail generator 216B may monitor an operating status of, or otherwise be in communication with, one or more other computer devices, and may generate one or more electronic messages, e.g., a trouble ticket or issue report, and direct the electronic message to one or more recipients, or to an alias of a distribution list, according to the SNMP protocol.

For example, with regard to a trouble ticketing or issue reporting system, a user having access to a secure bucket having one or more trouble tickets or issue reports stored therein may update one of the trouble tickets or issue reports, thereby causing an updated notice message to be automatically generated to each of the members of distribution lists associated with the trouble ticket. In some embodiments, for example, a "new product launch" issue report, or an issue report associated with another significant event, may be generated and distributed to each of the members of a distribution list. The issue report may include or describe a plurality of tasks or conditions precedent that must be performed in association with the event (e.g., marketing review, product compliance review, patentability or clearance review, or the like), with varying levels of sensitivity or content-based restrictions. When one of the tasks is to be delegated to a predetermined user, e.g., assigning a task of logo design to a graphic designer, an authorized user may upload product details or attributes to the secure bucket and trigger the sending of a notice message, such as by one or more selectable buttons or other features (e.g., "send for review"), to the graphic designer and other members of a distribution list associated with the event or the secure bucket. When the task is completed, e.g., when a draft of the logo has been prepared, the graphic designer may enter a comment such as "approved" or "completed" into the issue report, and such entry may trigger the sending of a message to the other members of the distribution list. Likewise, when a patent attorney is tasked with performing a clearance analysis in association with the event, the patent attorney may add a label of "modify product design around U.S. Pat. No. 1,234,567" to the issue report, or labels such as "privileged and confidential," to ensure that the issue report, or information regarding the associated tasks generated by the patent attorney with regard to the clearance analysis, are not subject to discovery during litigation. One or more of the systems and methods of the present disclosure may be configured to recognize and interpret the label, and to cause information regarding the clearance analysis to be diverted to the secure bucket, from which the note or the clearance analysis may be accessed via authorized users only, and not to the distribution list directly. In this regard, one or more of the systems and methods of the present disclosure may be incorporated into a traditional trouble ticketing or issue reporting system, e.g., by acting as a gateway for sensitive or restricted content associated with the resolution of a trouble ticket or a resolution of an issue report, and may be configured to recognize and divert such sensitive content, or allow such content that does not qualify as either sensitive or restricted to pass through to each of the authorized recipients of the trouble ticket or issue report.

The E-mail servers 220, 250 may include any type of computing device, including but not limited to a network computer, a cloud computing device, a mainframe computer, or any like computing system or machine, configured for the sending, receipt or storage of electronic mail. In some embodiments, one or more of the E-mail servers 220, 250 may comprise a cluster, cloud, farm, or other grouping of multiple devices that coordinate operations to provide load balancing, failover support, parallel processing capabilities, shared storage resources, or other aspects. The one or more E-mail servers 220, 250 may operate according to one or more of the SMTP protocol, the POP3 protocol or the IMAP protocol, and may be configured for receiving outbound E-mail messages, inbound E-mail messages, or both outbound and inbound E-mail messages. Furthermore, the E-mail servers 220, 250 may be maintained or operated by Internet Service Providers ("ISP"), web-hosting services or any other entities, or in association with one or more commercial, residential, social or governmental agencies (not shown). Those of ordinary skill in the pertinent arts will recognize that one or more other computing devices (e.g., servers or other like systems or machines) may perform the functions of the E-mail servers 220, 250 on behalf of any other type or form of messaging system or protocol, including but not limited to SMS or MMS messages, RSS, social network messages, instant messages, or the like.

As is shown in FIG. 2A, the E-mail server 220 includes a mail submission agent 222, a gateway module 224 and one or more data stores 226. The mail submission agent 222 may be a software module and/or hardware component that is configured to receive E-mail messages from one or more client devices and/or applications, e.g., the E-mail client 216A or the E-mail generator 216B, and to evaluate and process the E-mail messages according to one or more established procedures or protocols. For example, the mail submission agent 222 may obtain an IP address associated with an E-mail address, and transfer the E-mail message directly to another E-mail server (e.g., the E-mail server 250). As is also shown in FIG. 2A, the E-mail server 250 includes a mail delivery agent 252 and one or more data stores 256. The mail delivery agent 252 may be a software module and/or hardware component that is configured to receive E-mail messages from one or more other servers or agents and store such messages in one or more dedicated files, accounts or volumes for retrieval by an intended recipient thereof. For example, when an E-mail message intended for delivery to an E-mail address of jblack@acmecorp.org is received at the mail delivery agent 252, the E-mail message may be stored in a password-protected file or folder and retrieved by an E-mail client or other application by the holder of the account associated with the E-mail address jblack@acmecorp.org.

The data stores 226, 256 may be any computer storage devices or media for storing information or data thereon, and may, in some embodiments, be embodied in non-volatile memory, such as flash, magnetic, or optical rewritable non-volatile memory. In particular, the data stores 226, 256 may contain account information for one or more users having E-mail addresses associated with the E-mail servers 220, 250, including but not limited to one or more of the users 210A, 260-1, 260-2 . . . 260-*n*. The data stores 226, 256 may contain account information for one or more of such users 210A, 260-1, 260-2 . . . 260-*n*, including but not limited to a listing of accounts and online resources of such users 210A, 260-1, 260-2 . . . 260-*n*.

In some embodiments, the account information stored in the data stores 226, 256 may include user names or other identifiers, e.g., names, E-mail addresses or phone numbers of the users 210A, 260-1, 260-2 . . . 260-*n*, as well as credentials for verifying or authenticating the users 210A, 260-1, 260-2 . . . 260-*n*. The credentials may include, but are not limited to, passwords, encryption keys, client certificates, bearer tokens, or the like, as well as registration information for identifying a secure environment associated with each account. In some embodiments, the data stores 226, 256 may further include separate data tables, databases, data documents, dynamic data storage schemes and/or other data storage mechanisms and media for storing data relating to any particular aspect of the present disclosure. Additionally, the data stores 226, 256 may be operable, through logic associated therewith, to receive instructions from the E-mail servers 220, 250 and obtain, update or otherwise process information or data in response to such instructions.

Although some examples herein may describe the E-mail servers 220, 250 as physically separate devices, implementations of the present disclosure are not so limited. For example, in some embodiments, the E-mail servers 220, 250 may be dedicated to a specific purpose, such as the receipt, processing and transfer of outgoing E-mail (e.g., the E-mail server 220) or the receipt, processing and transfer of incoming E-mail (e.g., the E-mail server 250). The computing devices 212A, 212B, the gateway module 224, the secure storage facility 230, or the E-mail servers may be entirely different network domains, e.g., domains that are separated by firewalls or other physical or virtual mechanisms. Additionally, those of ordinary skill in the pertinent arts will recognize that the E-mail servers 220, 250 may be local to one or more of the computing devices 212A, 212B, 262-1, 262-2 . . . 262-*n*, or hosted at one or more remote sites and connected to such devices via the network 280. Furthermore, the E-mail servers 220, 250 may include or be a component part of one or more of a virtual computing environment, a hypervisor, a device emulation, or a virtual machine executing on one or more physical computing devices.

The gateway module 224 may be any software application or hardware component configured to evaluate content of E-mail messages, or attributes of senders or recipients of E-mail messages, and determine whether such E-mail messages satisfies one or more access-based standards or metrics. For example, the gateway module 224 may compare the content of an E-mail message to one or more content-based rules or restrictions, and may either transfer the E-mail message to the secure storage facility 230 for storage, or allow the E-mail message to pass through to one or more intended recipients. Moreover, upon determining that an E-mail message qualifies for storage within the secure storage facility 230, the gateway module 224 may be configured to transmit a notice message, such as the notice 15 of FIG. 1B, to one or more of the intended recipients of the E-mail message, or to cause such a notice message to be transmitted by another computer device, e.g., the E-mail server 220. The gateway module 224 may further validate the qualifications of one or more members of a distribution list, or authenticate one or more of such members (e.g., validating credentials or determining permissions of such members) in accordance with any authentication technique or process, or cause or execute any other action regarding an E-mail message, a sender of the E-mail message, or one or more recipients of the E-mail message.

Although the gateway module 224 is shown as residing or operating on the E-mail server 220, those of ordinary skill in the pertinent arts will recognize that the gateway module 224 may reside or operate on any other computing device connected to the network 280, e.g., the E-mail server 250, or any other computing device. Alternatively, the gateway module 224 may reside or operate on a free-standing computing device, e.g., the gateway module 124 shown in FIGS. 1A through 1D, or may reside or operate on one or more general purpose computer devices of any kind.

The secure storage facility 230 may be any computer device for storing information or data. As is shown in FIGS. 2A and 2B, the secure storage facility 230 includes one or more physical computer servers 232, processors 234 and data stores 236, which may, like the data stores 226, 256, be any computer storage devices or media for storing information or data thereon. In some embodiments, as compared to the data stores 226, 256, the secure storage facility 230 may have enhanced security measures or features (e.g., physical or virtual) that enable information or data to be stored therein at a higher level of security or with greater confidence. For example, the secure storage facility 230 may be located in a physically secure structure or building, and may be have restricted virtual access via a firewall, virtual personal network (or VPN) or like barrier, with one or more monitoring systems for tracking and recording access to the secure storage facility 230, or attempts to access the secure storage facility 230.

As is shown in FIG. 2B, the data store 236 includes a plurality of buckets 240-1, 240-2 . . . 240-*m*, or storage spaces that may be associated with a distribution list or any other concept. In some embodiments, one or more of the buckets 240-1, 240-2 . . . 240-*m* may be a file system directory or folder, or like component, and may form a basis for accounting for usage of the storage facility 230 by members of a distribution list or any other entities. Each of the buckets 240-1, 240-2 . . . 240-*m* may be used to store one or more objects, e.g., a sequence or set of bits of any type. For example, the objects may include or represent electronic messages, text data, executable program code, audio, video or image data, or any other type of digital data, each of which may be stored or manipulated within the secure storage facility 230 in a similar fashion.

As is also shown in FIG. 2B, each of the buckets 240-1, 240-2 . . . 240-*m* includes associated metadata 242-1, 242-2 . . . 242-*m*, as well as a specified access policy 244-1, 244-2 . . . 244-*m*. Generally speaking, the metadata 242-1, 242-2 . . . 242-*m* may include any suitable information or data that may be used to describe aspects or properties of a corresponding one of the buckets 240-1, 240-2 . . . 240-*m*, or instructions of handling contents of the buckets 240-1, 240-2 . . . 240-*m*. For example, the metadata 242-1, 242-2 . . . 242-*m* may include information identifying a date on which a bucket was created, an identity of a user who created the bucket, identities of users having access to the bucket, whether the bucket includes any objects (e.g., E-mail messages or content thereof), or any other relevant information. In some embodiments, the metadata 242-1, 242-2 . . . 242-*m* may include information regarding usage of a respective one of the buckets 240-1, 240-2 . . . 240-*m*, e.g., a total size of one or more files stored therein, or any history surrounding access to the one of the buckets 240-1, 240-2 . . . 240-*m* (e.g., times or dates on which access to the buckets 240-1, 240-2 . . . 240-*m* was granted or denied, and to which users, and/or IP addresses of computing devices from which access was requested). The metadata 242-1, 242-2 . . . 242-*m* may also include a predetermined expiration time, period or interval at which content within the one of the buckets 240-1, 240-2 . . . 240-*m* may automatically expire or be automatically deleted.

In some other embodiments, each of the buckets 240-1, 240-2 . . . 240-*m* may be associated with a respective unique identifier, e.g., of a user or distribution list associated to and/or assigned to the one of the buckets 240-1, 240-2 . . . 240-*m*. The identifier may be specified by a user or automatically assigned to the one of the buckets 240-1, 240-2 . . . 240-*m* by the storage service. The unique identifier may be stored within the metadata 242-1, 242-2 . . . 242-*m* of the one of the buckets 240-1, 240-2 . . . 240-*m*, or as a separate property or field within the buckets 240-1, 240-2 . . . 240-*m*.

The access policies 244-1, 244-2 . . . 244-*m* may include any information needed to control access to objects associated with one of the buckets 240-1, 240-2 . . . 240-*m*. The access policies 244-1, 244-2 . . . 244-*m* may include information identifying a user or users (e.g., members of a distribution list) that are permitted to access the one of the buckets 240-1, 240-2 . . . 240-*m* and its associated objects, and in which capacity. For example, one of the buckets 240-1, 240-2 . . . 240-*m* may store user identifiers and/or authentication credentials (e.g., passwords) for one or more of the users 210A, 260-1, 260-2 . . . 260-*n*, and may further specify whether a given user is allowed to read, modify or copy objects in a given bucket, write objects to the bucket and/or remove objects from the bucket. The access policies 244-1, 244-2 . . . 244-*m* may also implement default, customized or group-oriented policies which limit read access or write access to subsets of a given group, or according to any other security or access-limiting model.

The directory 246 may be any may include any type of computing device, including but not limited to a network computer, a cloud computing device, a mainframe computer, or any like computing system or machine, configured for receiving, storing and providing access to information regarding one or more users, e.g., the users 210A, 260-1, 260-2 . . . 260-*n*, including but not limited to profile information for such users. For example, the directory 246 may maintain and store names, nicknames, usernames, E-mail addresses (e.g., user names and domains) or other contact paths, telephone numbers and/or extensions, street and/or mailing addresses or business contacts (e.g., superiors, associates or assistants) of members of a single organization or entity, or of multiple organizations or entities, including but not limited to the users 210A, 260-1, 260-2 . . . 260-*n*, as well as credentials for verifying or authenticating the users 210A, 260-1, 260-2 . . . 260-*n*. Such credentials may include, but are not limited to, passwords, encryption keys, client certificates, bearer tokens, or the like, as well as registration information for identifying a secure environment associated with each account. In some embodiments, the directory 246 may further include separate data tables, databases, data documents, dynamic data storage schemes and/or other data storage mechanisms and media for storing data relating to any particular aspect of the present disclosure.

When an electronic message is generated by a messaging client in association with the directory 246, e.g., the E-mail client 216A or the E-mail generator 216B, the electronic message may be automatically populated or addressed using information regarding intended recipients that is stored within the directory 246, e.g., in one or more profiles. Likewise, when a distribution list is created, the distribution list may include identifiers of one or more intended recipients that may be correlated to information stored within the directory 246 (e.g., one or more contact paths for such recipients). Furthermore, in some embodiments, the buckets 240-1, 240-2 . . . 240-*m* may point to or otherwise reference one or more identifiers of information regarding users who are authorized to access contents thereof that may be stored in the directory 246. For example, the metadata 242-1, 242-2 . . . 242-*m* may include identifiers of such users and, upon receiving a message or other file for storage in one or more of the buckets 240-1, 240-2 . . . 240-*m*, or upon receiving a request for a message or other file stored in one or more of the buckets 240-1, 240-2 . . . 240-*m*, the users who are authorized to access the contents thereof may be identified based on the metadata 242-1, 242-2 . . . 242-*m*.

Although some examples herein may describe the directory 246 as a device that is physically separate from one or more of the E-mail servers 220, 250, or the secure storage facility 230, implementations of the present disclosure are not so limited. For example, in some embodiments, those of ordinary skill in the pertinent arts will recognize that the directory 246 may be a component part of one or more of the E-mail servers 220, 250 or the secure storage facility 230. In some other embodiments, those of ordinary skill in the pertinent arts will also recognize that the E-mail servers 220, 250 may be local to one or more of the computing devices 212A, 212B, 262-1, 262-2 . . . 262-*n*, hosted at one or more remote sites and connected to such devices via the network 280, or include or be a component part of one or more of a virtual computing environment, a hypervisor, a device emulation, or a virtual machine executing on one or more physical computing devices.

The users 260-1, 260-2 . . . 260-*n* may, like the user 210A, be any owners, operators or users of computer devices 262-1, 262-2 . . . 262-*n*, or any other like machine that may operate or access one or more software applications, such as web browsers, E-mail clients or social network applications (not shown), or any other type or form of application. The computer devices 262-1, 262-2 . . . 262-*n* may be connected to or otherwise communicate with the E-mail servers 220, 250, the secure storage facility 230 or the computer device 212A via the network 280, as indicated by lines 265A, 265B . . . 265-*n*, by the transmission and receipt of digital data. Like the computer devices 212A, 212B, the computer devices 262-1, 262-2 . . . 262-*n* may be specially adapted devices, or general purpose devices such as desktop computers, tablet computers, laptop computers, smartphones, personal digital assistants, digital media players, electronic book readers, set-top boxes, televisions, appliances or automobiles, as well as wearable computer devices such as augmented reality glasses or wristwatches, and may include any form of input and/or output peripherals such as scanners, readers, keyboards, keypads, touchscreens or pointing devices.

In some embodiments, the users 210A, 260-1, 260-2 . . . 260-*n* may access the secure storage facility 230 and interact with one or more of the buckets 240-1, 240-2 . . . 240-*m* according to a web services model. An interface with the secure storage facility 230 may be accessible by the users 210A, 260-1, 260-2 . . . 260-*n* as a web services endpoint having a Uniform Resource Locator (URL), e.g., http://secure.storage.domain.com, to which web services calls generated by the computer devices 212A, 212B, 262-1, 262-2 . . . 262-*n* may be directed for processing. A web service may refer to any type of computing service that is made available to a requesting client via a request interface that includes one or more Internet-based application layer data transport protocols, such as a version of the Hypertext Transport Protocol (HTTP) or another suitable protocol. In accordance with the present disclosure, web services may be implemented in a variety of architectural styles, using a variety of enabling service protocols.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "user," an "E-mail server," a "secure storage facility" or "storage facility," or like terms, may be automated steps performed by their respective computer systems, or implemented within software modules (or computer programs) executed by one or more general purpose computers. Moreover, process steps described as being performed by a "user," an "E-mail server," a "secure storage facility" or "storage facility," or like terms, may be typically performed by a human operator, but could, alternatively, be performed by an automated agent.

The users 210A, 260-1, 260-2 . . . 260-*n* and/or the computer devices 212A, 212B, 262-1, 262-2 . . . 262-*n*, the E-mail servers 220, 250 and/or the secure storage facility 230 may use any web-enabled or Internet applications or features, or any other client-server applications or features including electronic mail (or E-mail), or other messaging techniques, to connect to the network 280 or to communicate with one another, such as through SMS or MMS text messages, RSS or social network messages or instant messages. For example, the computer devices 212A, 212B, 262-1, 262-2 . . . 262-*n* may be adapted to transmit information or data in the form of synchronous or asynchronous messages to the E-mail servers 220, 250, the secure storage facility 230 or any other computer device in real time or in near-real time, or in one or more offline processes, via the network 280. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory or non-transitory computer-readable medium that is within or accessible by computers or computer components such as the computer devices 212A, 212B, 262-1, 262-2 . . . 262-*n*, the E-mail servers 220, 250 and/or the server 232, the processor 234 or the data store 236, or any other computers or control systems utilized by the users 210A, 260-1, 260-2 . . . 260-*n*, the automated notification service 210B, or the secure storage facility 230, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
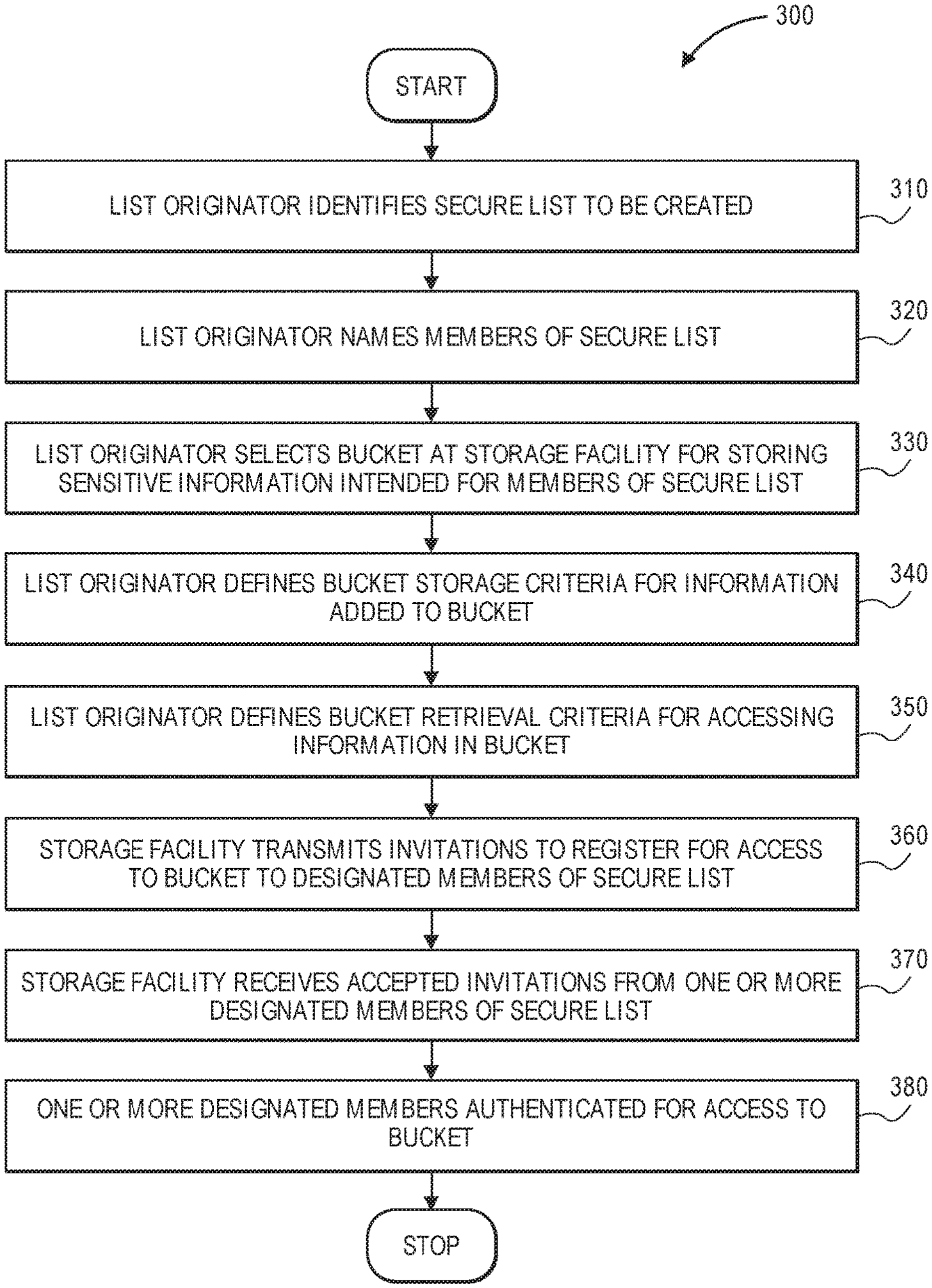
FIG. 3 is a flow chart of one process for secure messaging in accordance with embodiments of the present disclosure.

As is discussed above, a distribution list may be created and assigned to a bucket or other storage space within a secure storage facility. Any content intended for delivery to the distribution list (e.g., one or more electronic messages and/or attachments thereto) that meets one or more of predetermined filtering criteria (e.g., bucket storage criteria) may be diverted to the bucket. Members of the distribution list who are authorized to receive the content may access the content directly via the bucket, subject to one or more retrieval criteria, according to a secure (e.g., access-controlled or encrypted) connection such as a Secure Sockets Layer (SSL) or Transport Layer Security (TLS) connection, rather than by receiving the content in an E-mail message transferred via one or more E-mail servers, which may or may not be secure. Referring to FIG. 3, a flow chart 300 representing one embodiment of a process for secure messaging in accordance with embodiments of the present disclosure is shown.

At box 310, a list originator identifies a secure list to be created, and at box 320, the list originator names one or more members of the secure list. For example, the list originator may enter contact paths or other identifiers of the members into one or more text boxes provided on one or more user interfaces, or select such identifiers from a drop-down list or other feature associates with a directory of information (e.g., profiles) of such members. The user interfaces may be generated by a browser or other application configured to permit access to a secure storage facility or one or more buckets therein, by a mail user agent or client application configured to permit the creation of a secure list and/or the identification of one of one or more members thereof, or in any other manner.

The list originator may label the list with one or more keywords corresponding to a purpose for the list (e.g., Personnel Division, Strategic Plan), a duration or expiration of the list (e.g., Christmas 2016), or characteristics of one or more of the members of the list (e.g., Grandma's Grandkids). An alias for the list may be defined based on one or more of the keywords. The list originator may further enter one or more identifiers or attributes of the members of the list, such as their first or last names, E-mail addresses or telephones, and the list may be generated based on such identifiers or attributes.

At box 330, the list originator selects a bucket at a storage facility for storing sensitive information intended for members of the secure list. As is discussed above, the bucket may be a folder or other storage space in a data store associated with the storage facility. Alternatively, the bucket may be automatically and/or randomly selected on behalf of, or designated for, the secure list. At box 340, the list originator defines one or more bucket storage criteria for information to be added to the bucket. For example, the list originator may specify one or more keywords such as "confidential," "secret" or a predetermined format or template corresponding to a number of an account held at a financial institution (e.g., fifteen-digit or sixteen-digit credit card numbers, nine-digit routing numbers, or any other number satisfying the Luhn algorithm) as filters, flags or triggers for qualifying a message for storage in the bucket. Other bucket storage criteria may include, but are not limited to, identities of senders, content of subject lines, times or dates of generation or transmission, or any other factor associated with an electronic message. Any criteria for storing information in the bucket, including but not limited to content-patterning filters, which designate the information for storage based at least in part on its content, or data-mapping filters, which designate the information for storage based at least in part on information and/or attributes regarding a sender or one or more recipients, may be designated by the list originator in accordance with the present disclosure.

At box 350, the list originator defines one or more bucket retrieval criteria for accessing information in the bucket. For example, where the list originator specifies the one or more users who have access to information stored in one or more buckets of a secure storage facility, the list originator may also specify the conditions under which such users may access or retrieve information from the secure storage facility, e.g., by designating a type or form of authentication that may be required, or a number of levels associated with the authentication, as well as any restrictions on IP addresses of computer devices to which the information may be provided (e.g., whitelisted or blacklisted machines).

At box 360, the storage facility transmits invitations to register for access to the bucket to designated members of the secure list. The invitations may be transmitted by electronic mail, instant message or any other electronic communications protocol or format. Alternatively, such invitations may be provided via traditional mail or in another written form. At box 370, the storage facility receives accepted invitations from one or more of the designated members of the secure list. At box 380, one or more of the designated members is authenticated for access to the secure bucket, e.g., through one or more authentication or registration processes (such as a multifactor authentication process and/or an identity and access management system), and the process ends.

Figure 4A:
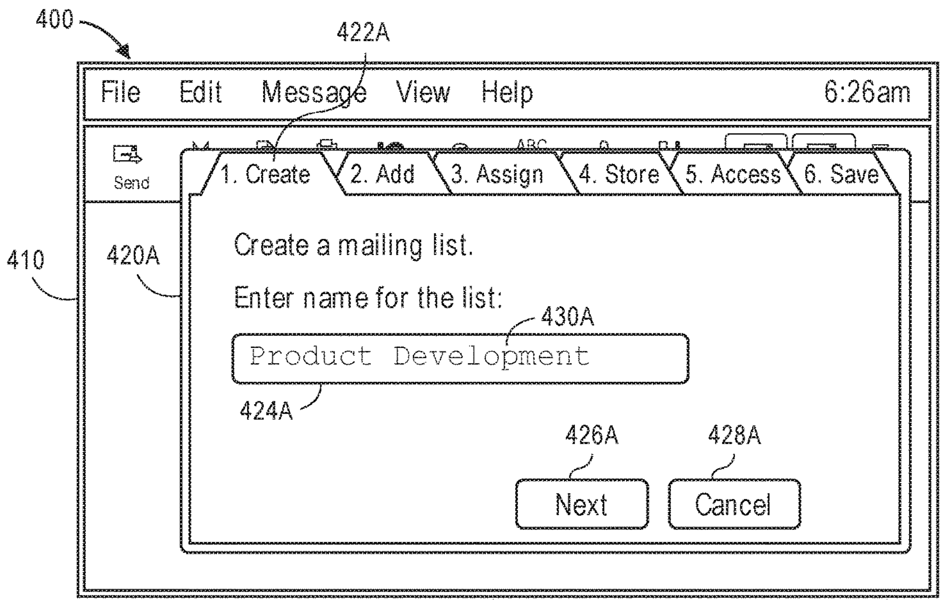
FIGS. 4A through 4F are views of interfaces displayed by one system for secure messaging in accordance with embodiments of the present disclosure.

As is discussed above, a list generator may create a distribution list and assign the distribution list to a secure bucket using any type or form of user interface. Referring to FIGS. 4A through 4F, views of interfaces displayed by one system for secure messaging in accordance with embodiments of the present disclosure are shown. As is shown in FIG. 4A, a display screen 400 displays a browser 410 having rendered networked content thereon. The browser 410 includes a first window 420A for beginning a process of creating a mailing list that may be shown following an initiation of the process, or upon the selection of a tab 422A (viz., "Create"). The first window 420A may be displayed as an individual screen of an E-mail client, or as a pop-up window or other feature over a screen associated with the E-mail client. The first window 420A includes a text box 424A, a button 426A for advancing to a next step in the process and a button 428A for canceling the process. The text box 424A includes a name 430A for the mailing list (e.g., "Product Development") therein.

Figure 4B:
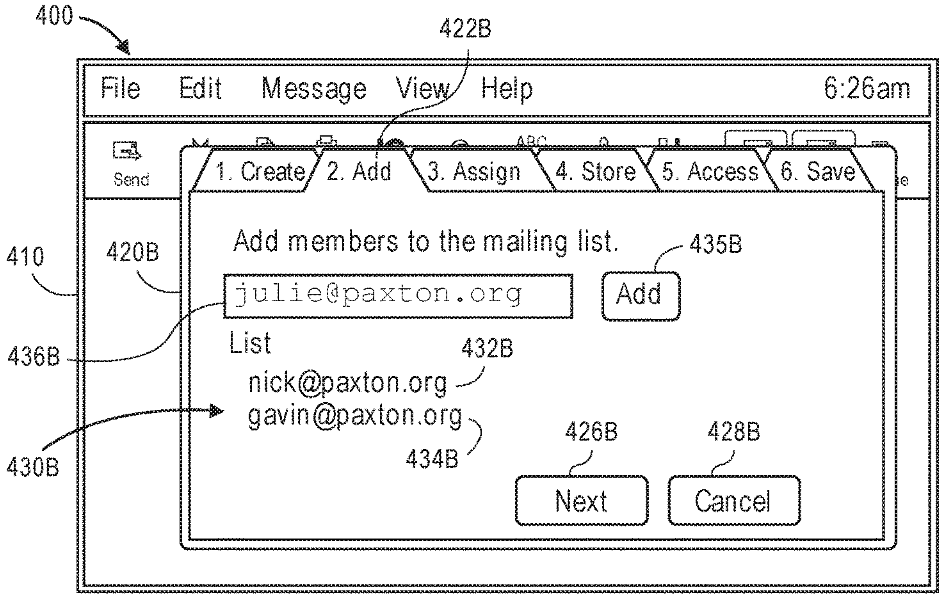
Figure 4C:
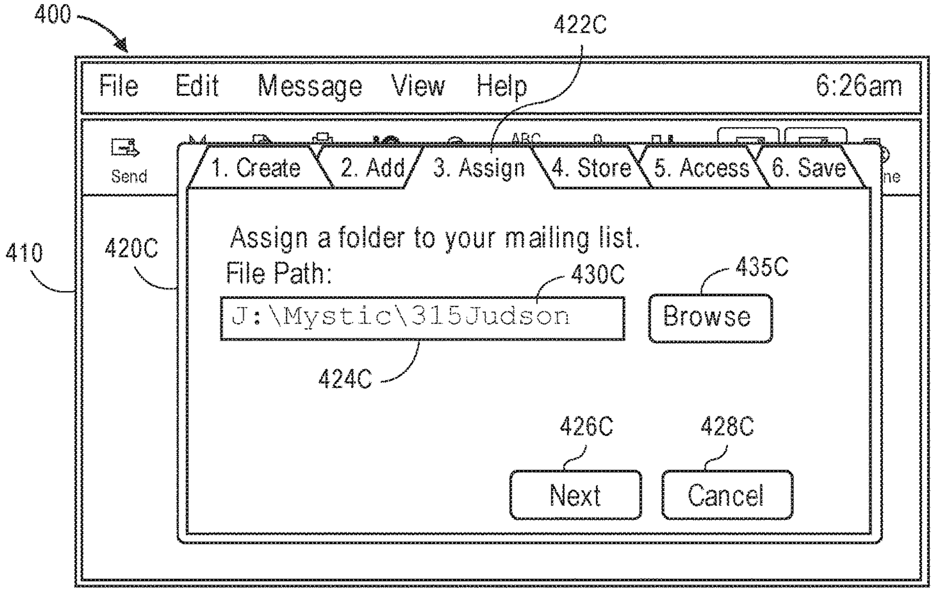

As is shown in FIG. 4B, after the name 430A is entered into the text box 424A of FIG. 4A, and the button 426A is selected, a second window 420B for adding members to the E-mail list is shown. The second window 420B includes a text box 424B for entering E-mail addresses 430B to be included in the mailing list, and further shows other E-mail addresses 432B, 434B that have already been added to the mailing list. The second window 420B further includes buttons 426B, 428B for advancing to a next step in the process or canceling the process, respectively. As is shown in FIG. 4C, after a plurality of E-mail addresses have been added to the list via the text box 424B, and the button 426B is selected, a third window 420C for selecting a secure bucket or folder is shown. The third window 420C includes a text box 424C for entering a file path 430C corresponding to a secure bucket, or a button 435C for browsing to locate the file path 430C. The third window 420C further includes buttons 426C, 428C for advancing to a next step in the process or canceling the process, respectively.

Figure 4D:
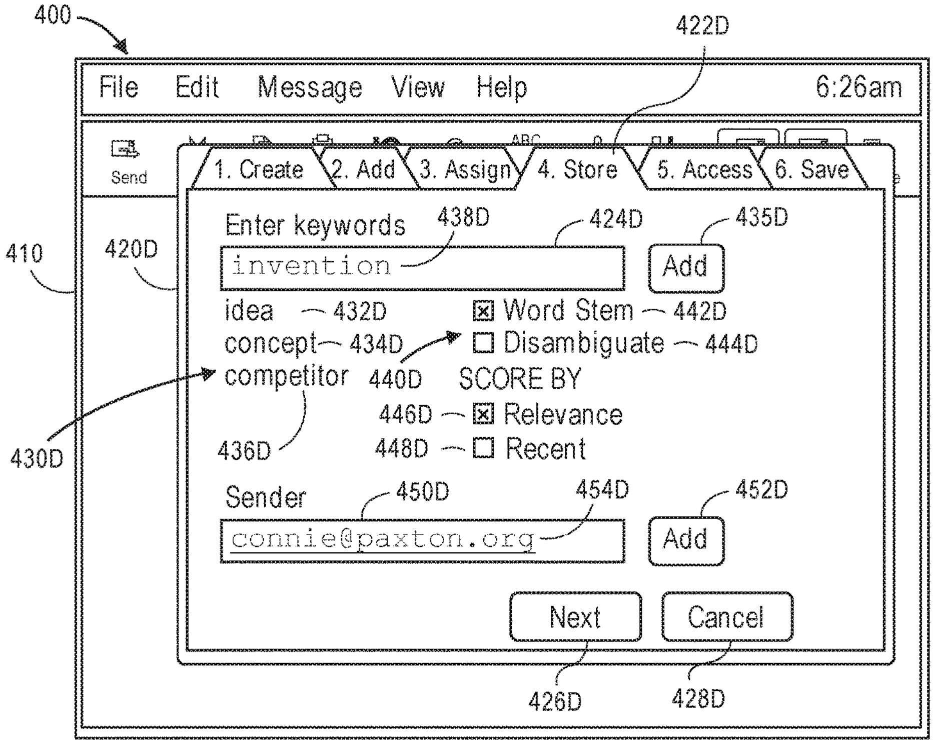
Figure 4E:
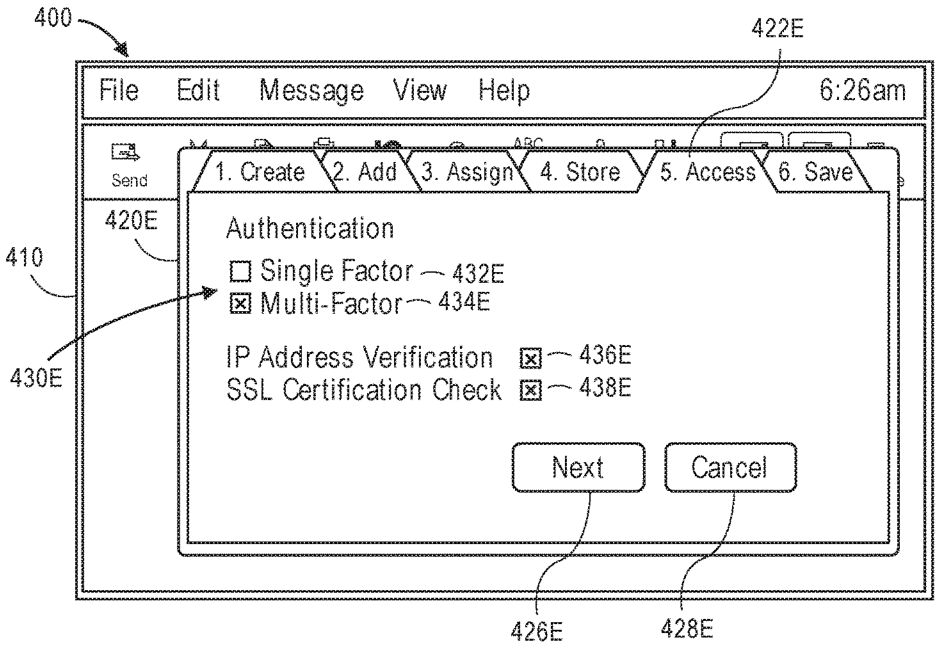

As is shown in FIG. 4D, after the file path 430C for the secure bucket has been designated, e.g., by entering the file path 430C into the text box 424C or browsing and finding the file path 430C upon selecting the browse button 435C, a fourth window 420D for designating bucket storage criteria is shown, e.g., after the button 426C is selected. The fourth window 420D includes criteria 430D or conditions for qualifying a message for storage in the secure bucket, including a plurality of keywords 432D, 434D, 436D, each of which may be associated with the secure bucket by selecting an add button 435D. The fourth window 420D also includes a plurality of search commands 440D, including check boxes 442D, 444D, 446D, 448D corresponding to instructions for interpreting keywords with respect to contents of a message (e.g., word stemming, disambiguation or word scoring criteria). The fourth window 420D further includes a text box 450D for designating one or more senders from which messages are to be directed to the secure bucket. When the contact paths for the one or more senders, viz., a sender 452D, is entered into the text box 450D, the contact paths may be associated with the secure bucket by selecting an add button 454D. Alternatively, those of ordinary skill in the pertinent arts will recognize that options for designating other bucket search criteria (e.g., an identity of a sender, a date or a time, or any other relevant factor) may be presented within the windows 420A, 420B, 420C, 420D, 420E, or in one or more additional windows or in any other manner. For example, a list generator may be permitted to set an expiration time for content within the secure bucket, or such an expiration time may be determined by default, and content within the secure bucket may be automatically deleted after the expiration time, via one or more windows. The fourth window 420D further includes buttons 426D, 428D for advancing to a next step in the process or canceling the process, respectively As is shown in FIG. 4E, after one or more bucket storage criteria have been designated, e.g., via the fourth window 420D, a fifth window 420E for designating bucket retrieval criteria is shown, e.g., after the button 426D is selected. The fifth window 420E includes criteria 430E or conditions that may be designated an originator of the distribution list and that must be met by a member of the distribution list in order to access content stored in the secure bucket. For example, the fifth window 420E includes check boxes 442E, 444E, 446E, 448E corresponding to types of authentication processes (e.g., single-factor or multi-factor) or verification procedures (e.g., IP address verification or SSL certificate checking), respectively. The fifth window 420E further includes buttons 426E, 428E for advancing to a next step in the process or canceling the process, respectively.

Figure 4F:
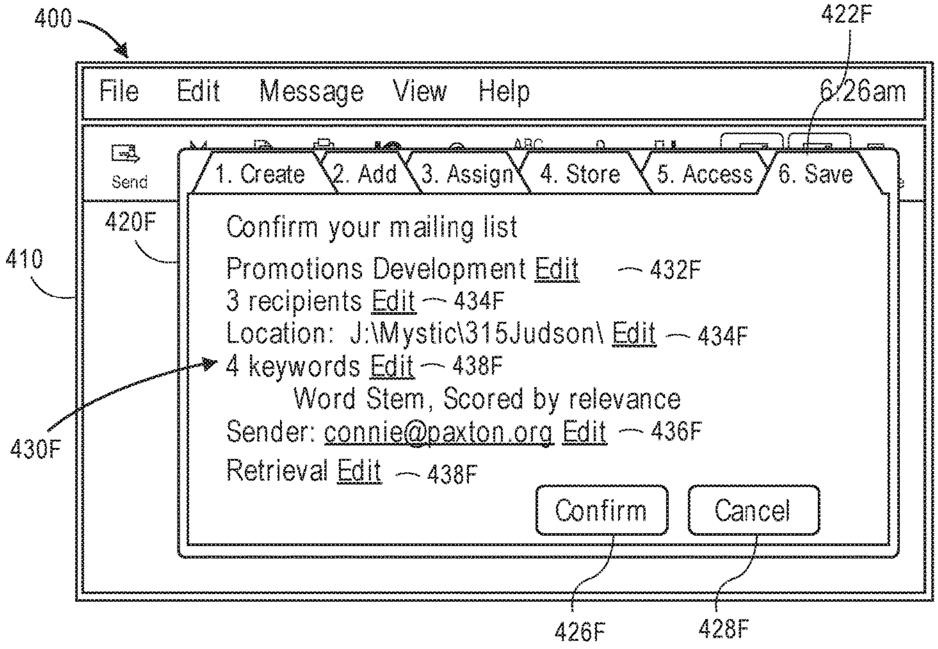

Finally, as is shown in FIG. 4F, after a name for the E-mail list has been provided, a plurality of E-mail addresses have been added to the E-mail list, a secure bucket for the E-mail list has been designated, and the bucket storage criteria and bucket retrieval criteria have been designated, a sixth window 420F for reviewing information 430F regarding the E-mail list is shown, e.g., after the button 426F is selected. The list generator may review the information previously entered via the windows 420A, 420B, 420C, 420D, 420E and confirm the creation of the list by selecting a button 426F or may cancel the process by selecting a button 428F. The list generator may edit the name of the E-mail list, the recipients, the location of the bucket, the keywords or other criteria qualifying a message for storage in the bucket, or the criteria for retrieving the message from the bucket, by selecting one or more of the links 432F, 434F, 436F, 438F. Those of ordinary skill in the pertinent arts will recognize that generators of lists may navigate forward or backward, or between and among, the windows 420A, 420B, 420C, 420D, 420E, 420F of FIGS. 4A through 4F by selecting the buttons 426A, 426B, 426C, 426D, 426E, 426F or by interacting with one of the tabs 422A, 422B, 422C, 422D, 422E, 422F.

Those of ordinary skill in the pertinent arts will recognize that distribution lists may be created and assigned to a secure bucket or other area of a secure storage facility in any manner. For example, one or more of the E-mail servers 220, 250 or the gateway module 224 of FIG. 2 may be configured to programmatically create a secure bucket, and grant access to the secure bucket to qualifying users, in certain situations.

Figure 5A:
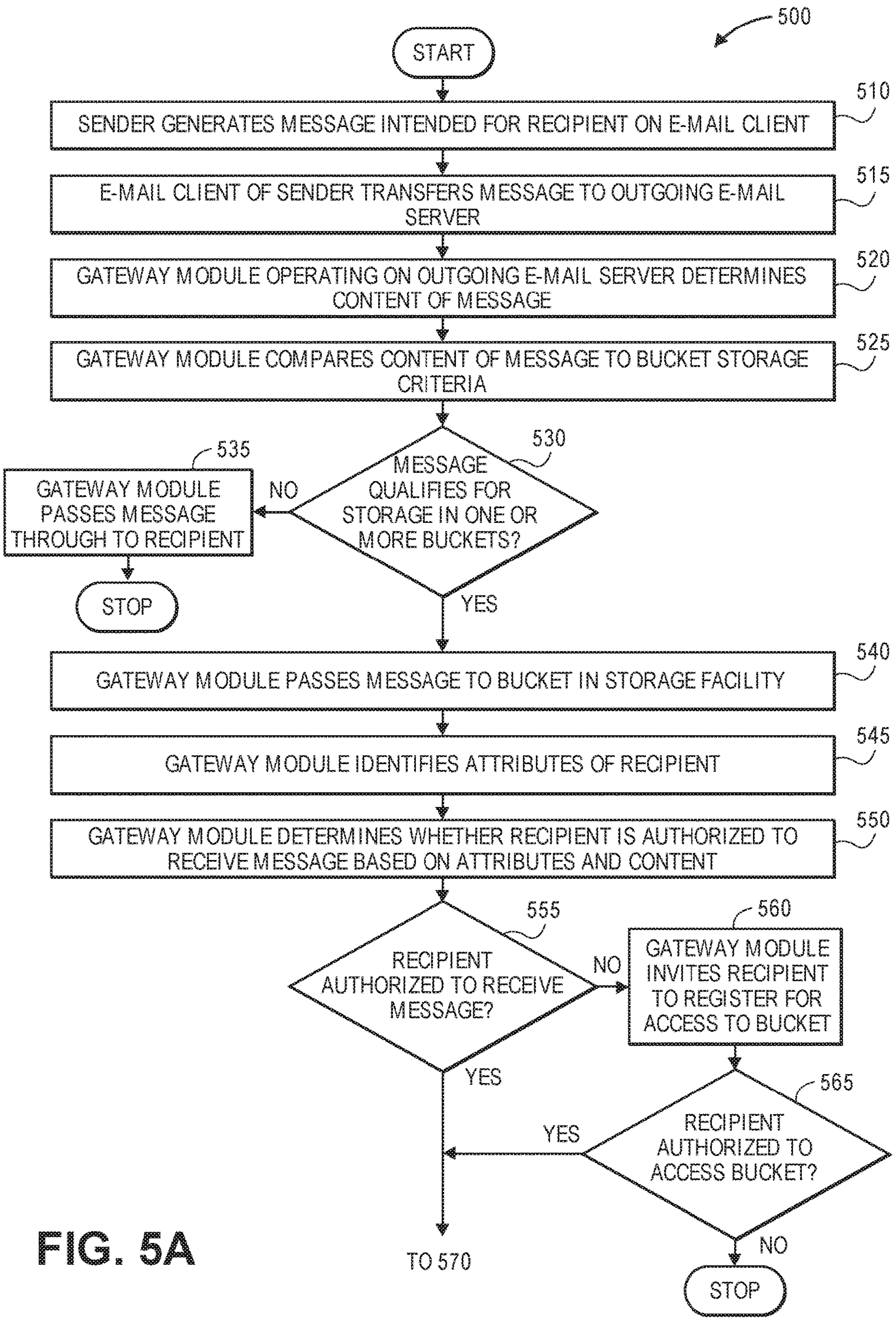
FIGS. 5A and 5B is a flow chart of one process for secure messaging in accordance with embodiments of the present disclosure.
Figure 5B:
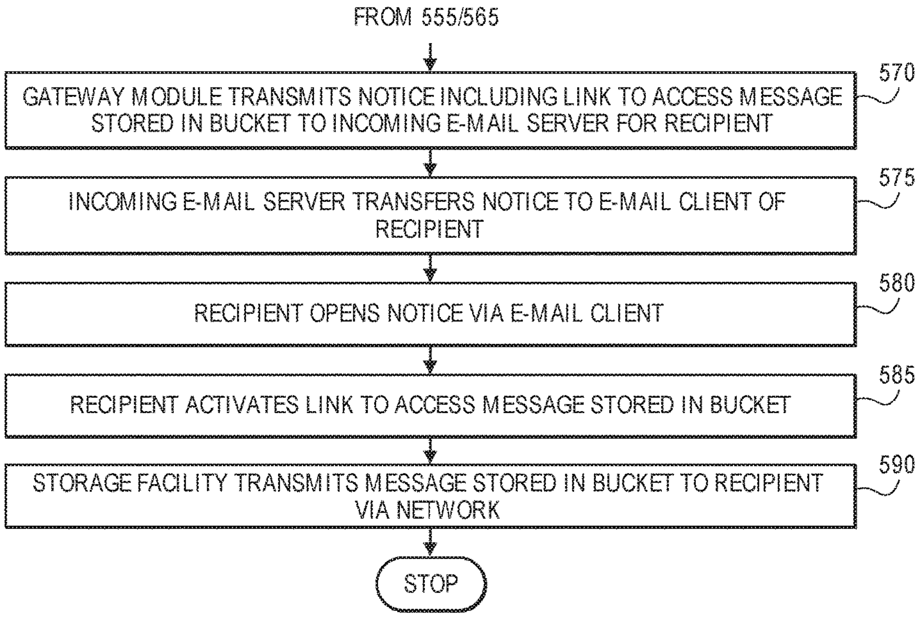

As is discussed above, a gateway module may cause a message or other file that satisfies one or more filtering or storage criteria to be routed to a secure bucket and stored, and may transmit a hyperlink to the message or file to intended recipients of the message, e.g., members of an E-mail list, one or more of which may be authenticated, and the message may be transferred from the secure bucket to the recipients directly rather than via traditional channels (e.g., by one or more E-mail servers). Referring to FIGS. 5A and 5B, a flow chart 500 representing one embodiment of a process for secure messaging in accordance with embodiments of the present disclosure is shown.

At box 510, a sender generates a message that is intended for a recipient via an E-mail client. The message may comprise any text or multimedia that may be embedded in the message, or included as one or more attachments. Alternatively, the message may be an SMS or MMS text message, an RSS feed, a social network message or an instant message created using a text messaging application, a social network application or an instant messaging application, respectively. At box 515, the E-mail client transfers the message to an outgoing E-mail server, e.g., according to an SMTP protocol. At box 520, a gateway module operating on the outgoing E-mail server determines the content of the message, and at box 525, the gateway module compares the content of the message to one or more bucket storage criteria. For example, where the message includes text provided in a body of the message or in an attachment, the gateway module may identify and evaluate the text against any text-based standards or restrictions that may be imposed on content of messages passing through the E-mail server. Where the message includes images, audio files, video files or other multimedia, the message may determine any relevant attributes of the multimedia, e.g., such as by identifying any edges, contours, outlines, colors, textures, silhouettes, shapes or other characteristics of objects, or portions of objects, expressed in still or moving digital images using one or more algorithms or machine-learning tools, and compare such objects to any standards or restrictions that may be imposed on content of messages passing through the E-mail server.

At box 530, whether the message qualifies for storage in one or more buckets is determined, e.g., based on the bucket storage criteria. If the message does not qualify for storage in one or more buckets, e.g., if the message does not satisfy any of the bucket storage criteria, then the process advances to box 535, where the gateway module allows the message to pass through to the recipient, and the process ends. If the message qualifies for storage in one or more of the buckets, then the process advances to box 540, where the gateway module passes the message to a bucket in the storage facility. For example, the gateway module may copy any text or images or other multimedia into a file stored in a bucket associated with the sender or the recipient, e.g., a bucket assigned to a mailing list. Alternatively, the gateway module may copy the message itself, in its entirety, e.g., as an .eml file, to the bucket.

At box 545, the gateway module identifies attributes of the recipient. For example, where the message is an E-mail, an E-mail address may be used to identify the recipient, and information regarding the recipient may be determined from a profile or other set of data maintained at an E-mail server or in a data store that may be independently maintained, e.g., the directory 146 of FIGS. 1A through 1D, or associated with an E-mail client of the recipient or the E-mail server. Alternatively, if the message is an SMS or MMS text message, a social network message or an instant message, a telephone number or a social network or instant messaging account to which the message is sent may be used to identify the recipient. At box 550, the gateway module determines whether the recipient is authorized to receive the message based on the attributes of the recipient and content of the message, e.g., according to any access policy that may be in place. For example, if the recipient is identified by his or her name, a look-up table including names and/or E-mail addresses of authorized recipients for content satisfying the bucket storage criteria may be consulted to determine whether the recipient is authorized to receive the message.

At box 555, if the recipient is not authorized to receive the message, then the process advances to box 560, where the gateway module invites the recipient to register for access to the bucket. For example, the gateway module may prompt the recipient to answer one or more questions or otherwise authenticate himself or herself through any type or form of authentication procedure (e.g., a password-based authentication protocol, fingerprint recognition, biometric scanning or a multi-factor authentication procedure). The gateway module may also automatically authenticate the user based at least in part on an IP address of his or her machine. In some embodiments, whether a recipient is to be prompted to register may be determined based on the qualifications or credentials of a sender of the message. For example, if the sender is permitted to generate distribution lists, to assign such lists to a bucket, or to authorize access to the bucket, then a transmission of a message from the sender to a recipient who is not, at the time that the message was transmitted, authorized to receive the message may result in an invitation to register as a member of the distribution list or for access the bucket. If the recipient is authorized to receive the message, however, then at box 570, the gateway module transmits a notice including a hyperlink to access the message stored in the bucket to an incoming E-mail server of the recipient, e.g., a POP3 protocol server or an IMAP protocol server, which may be associated with the E-mail address to which the message was originally intended to be sent at box 510, or with another known E-mail address for the recipient. At box 575, the incoming E-mail server transfers the notice to the E-mail client of the recipient, which may be a free-standing application or provided in a web page accessible via a browser.

At box 580, the recipient opens the notice via the E-mail client, and at box 585, the recipient activates the hyperlink included in the notice, such as by clicking on the hyperlink with a mouse or other pointing device, or by touching a portion of an interactive touchscreen corresponding to the hyperlink. At box 590, the storage facility transmits the message stored in the bucket to the recipient over a network in response to the activation of the hyperlink, and the process ends. Alternatively, if the recipient does not activate the hyperlink included in the notice, or after a predetermined time, the message may be automatically deleted from the bucket.

Those of ordinary skill in the pertinent arts will recognize that contents of a bucket, e.g., a message or another file, may be stored, handled or provided to users (such as members of a distribution list) in a manner of their choosing. In some embodiments, a user having access to a bucket may request or designate that messages or files included in the bucket be transformed into a predetermined format, style or language, or with one or more additional attributes, e.g., according to a transformation preference or selection. For example, a first user may prefer that a sensitive E-mail be delivered in a Portable Document Format (.pdf) file, while a second user may prefer that the sensitive E-mail be delivered in an archive file (e.g., a .zip format). Likewise, a third user may prefer that files that include content in the English language be automatically translated to Spanish prior to their delivery. A fourth user may also prefer that files including acronyms or abbreviations (e.g., "AAA," for American Automobile Association) may automatically expand such acronyms or abbreviations into their associated words or clauses prior to transferring the files, or selecting from one or more of a plurality of words or clauses that may be associated with the acronyms or abbreviations (e.g., whether "AAA" is intended to refer to the American Automobile Association, the American Arbitration Association, or the highest-level of play in minor league baseball). Information or data regarding storage, handling or transformation preferences of individual users may be maintained within a bucket of a secure storage facility, e.g., within the metadata 242-1, 242-2 . . . **242-*m* corresponding to the respective one of the buckets 240-1, 240-2 . . . 240-*m* shown in FIG. 2B, or in any other location, in accordance with the present disclosure. For example, when one or more of the buckets 240-1, 240-2 . . . 240-*m*** is established by an authorized user, the user may provide one or more indications as to the type, form, size or number of files that may be added to the buckets, and by which user or classes of users. In some embodiments, an account generated on behalf of a new employee may be configured to automatically translate company-specific acronyms included in an electronic message, or indicate relative rankings or levels of other recipients of the electronic message or individuals referenced therein. Information that is added or used to augment contents of a secure bucket may be obtained from one or more external sources or computer devices, e.g., additional context pertaining to a specific technology referenced in a message. Likewise, messages or other content in a secure bucket may be handled differently for other different classes of users. For example, directors may have real-time access to information that is incorporated into a message within a bucket upon entry (e.g., augmenting a message or other document with highly-confidential sales data associated with items mentioned in the message or document). Where facts referenced in a message added to a secure bucket change prior to a viewing of the message by one or more authorized users, changes in such facts may be identified, e.g., in a pop-up message, cloud or bubble adjacent to or in association with locations of the referenced facts. For example, where a trouble ticket or issue report in a secure bucket detailing information regarding a specific event that requires attention, the trouble ticket or issue report may be augmented with proposed solutions or other relevant information (e.g., whether such solutions are successful or to which extent), or search the secure bucket, or one or more other buckets or external sources, to determine whether a search in the TT system to see if a similar solution has been tried in the past along with an indication of whether the fix was successful).

Additionally, in accordance with the present disclosure, contents of a secure bucket may be reconstructed even after such contents have been removed therefrom, e.g., through a manual or automatic deletion process. For example, when access to a secure bucket is granted to a new user, e.g., when a new member is added to a distribution list, the secure bucket may repopulate itself with messages or other files that have been removed from the bucket previously, either since the distribution list was originally formed or associated with the bucket, or for another predefined time period. Such messages may be stored in the secure bucket again, or in one or more sub-buckets accessible to only new members, in order to avoid confusion among long-standing members of the distribution list, or members who have already viewed such messages. For example, referring again to the system 100 of FIGS. 1A through 1D, copies of messages or other files transmitted from the computer devices 112A, 112B to the gateway 124 may be maintained in a "sent items" folder or other space associated with a messaging client, or in an archive or other storage volume associated with the gateway 124. The secure storage facility 130 may, on command, or upon the recognition of another event such as the addition of a user to a distribution list, pull such messages or other files from the gateway 124 or the computer devices 112A, 112B to retrieve any copies of messages that were previously sent to the distribution list. Alternatively, the secure storage facility 130 may automatically retrieve copies of messages or other files from an archive or other facility. Once the secure storage facility 130 has been reconstructed, users having access to respective buckets of the storage facility 130, or all members of distribution lists associated with such buckets, may access and retrieve information within such buckets, e.g., upon selections of hyperlinks within notice messages, and subject to any retrieval criteria that may be imposed upon the information or the buckets.

Figure 6:
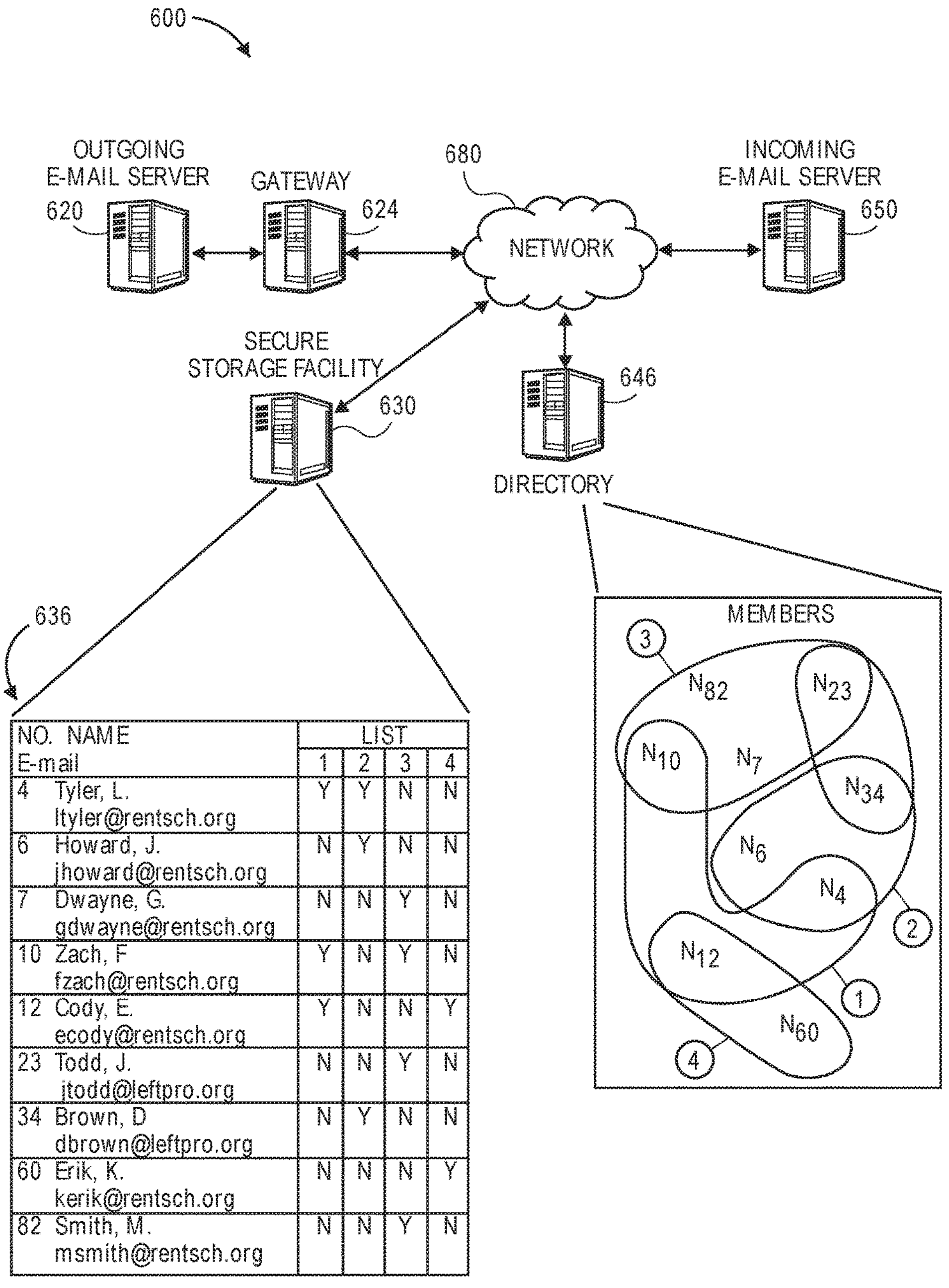
FIG. 6 is a view of aspects of one system for secure messaging in accordance with embodiments of the present disclosure.

As is discussed above, a secure storage facility may maintain and track information regarding distribution lists, which may be associated with and include members of an organization (e.g., a business, a non-profit organization or a college or university), or with members of two or more organizations. Referring to FIG. 6, a view of aspects of one system 600 for secure messaging in accordance with embodiments of the present disclosure is shown. Except where otherwise noted, reference numerals preceded by the number "6" in FIG. 6 refer to elements that are similar to elements having reference numerals preceded by the number "2" in FIG. 2A or FIG. 2B or by the number "1" shown in FIGS. 1A through 1D.

As is shown in FIG. 6, the system 600 includes an outgoing E-mail server 620, a gateway 624, a secure storage facility 630, a directory 646 and an incoming E-mail server 650 that are connected to one another across a network 680, such as the Internet. In accordance with the present disclosure, the outgoing E-mail server 620 may receive E-mail messages that are generated by one or more users of E-mail clients (not shown) and intended for delivery to an alias associated with one or more distribution lists, and may operate according to an SMTP protocol or any other protocol. The gateway 624 may evaluate such messages with respect to any previously established filtering or storage criteria, and determine whether any of such messages qualifies for storage in the secure storage facility 630 or may be passed through to an alias of a distribution list, and directly to the intended recipients. The secure storage facility 630 may maintain information regarding one or more distribution lists, e.g., identifiers of members having access to one or more secure folders or buckets therein, in accordance with any relevant access criteria in a data store 636, and may validate E-mail addresses and/or members of distribution lists on a regular basis (e.g., according to a predetermined schedule or at predetermined intervals) or at random times. For example, the directory 646 may include information or data regarding various members of the one or more distribution lists, viz., List 1, List 2, List 3 and List 4, which are shown in the form of a Venn diagram, and such information or data may be correlated with the corresponding identifiers of such members stored in the data store 636 of the secure storage facility 630. Although the outgoing E-mail server 620, the gateway 624, the secure storage facility 630, the directory 646 and the incoming E-mail server 650 are shown in FIG. 6 as separate components, in some embodiments, the outgoing E-mail server 620, the gateway 624, the secure storage facility 630, the directory 646 and the incoming E-mail server 650 may be the same computing device.

Thus, in accordance with the present disclosure, when an E-mail message intended for delivery to an alias associated with a distribution list is received at the outgoing E-mail server 620, the gateway 624 may evaluate the content of the message and determine whether the message qualifies for storage in the secure storage facility 630, e.g., in a bucket associated with the distribution list. If the content does not qualify for storage in the secure storage facility 630, then the gateway 624 may relay the message to the incoming E-mail server 650 and to each of the intended recipients. If the content qualifies for storage in one or more buckets of the secure storage facility 630, however, then the gateway 624 may store the content in a predefined space within the secure storage facility 630 and relay a notice message that includes a link to the message to the incoming E-mail server 650 and to each of the intended recipients, based on identifiers of such recipients stored in the data store 636 and/or information maintained in the directory 646. When one of the intended recipients selects the link, the message may be transferred directly to the intended recipient, e.g., such as by a secure (e.g., access-controlled or encrypted) connection, in accordance with any relevant retrieval criteria that may have been imposed on the message or the content thereof, or on the bucket in which the message and content are stored.

Figure 7:
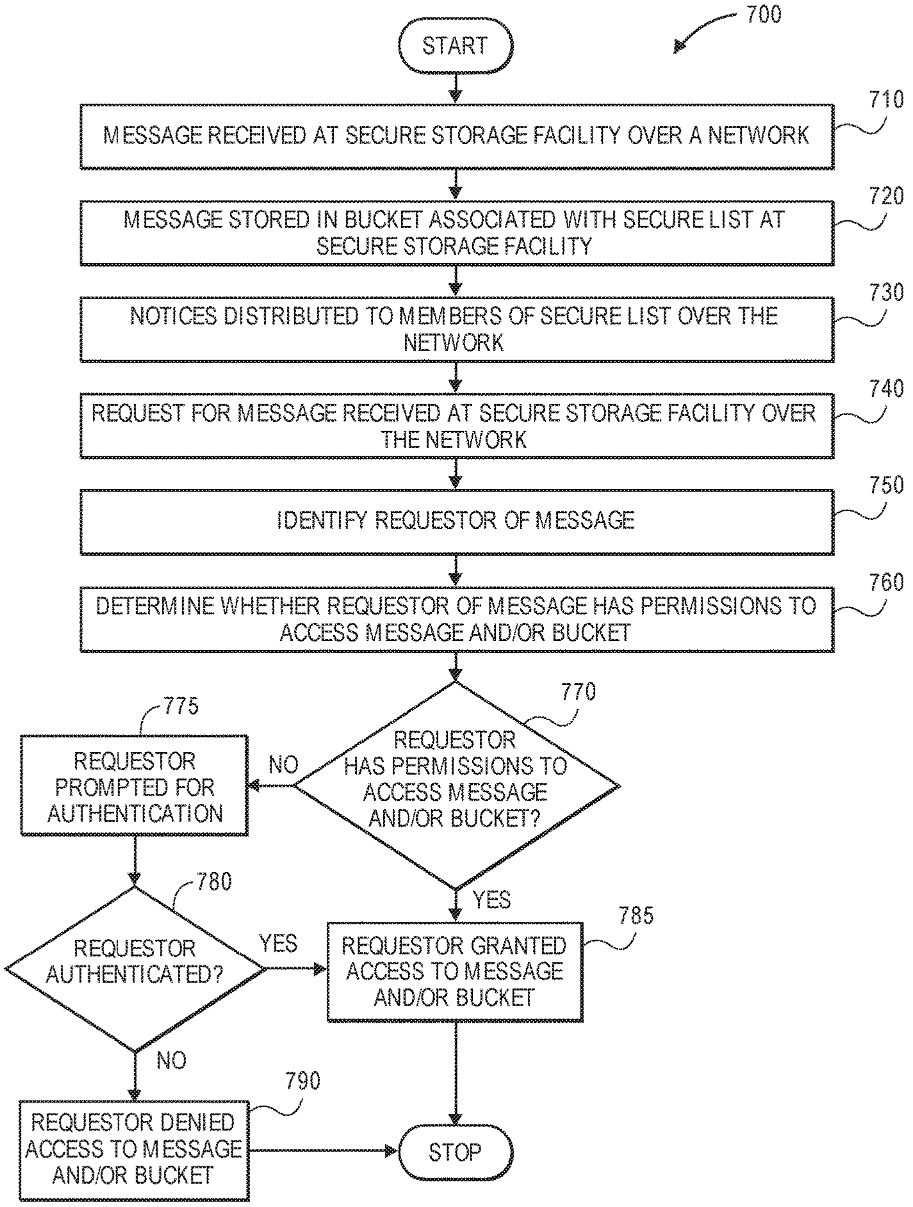
FIG. 7 is a flow chart of one process for secure messaging in accordance with embodiments of the present disclosure.

Referring to FIG. 7, a flow chart 700 representing one embodiment of a process for secure messaging in accordance with embodiments of the present disclosure is shown. At box 710, a message is received at a secure storage facility over a network, and at box 720, the message is stored in a bucket associated with a secure list. For example, the message may be intended for delivery to an alias for the secure list, which may have an associated bucket that is accessible only pursuant to an established access policy. At box 730, notices are distributed to members of the secure list over the network. The notices may be E-mail messages that include hyperlinks or other references to the message stored in the bucket at box 720, such as the notice 15 of FIG. 1B, or any other type of message that alerts the intended recipients that an E-mail message sent to the secure list is stored in the secure storage facility, or that contents of the bucket have changed. Alternatively, the notices may be SMS or MMS text messages, RSS feeds, social network messages or instant messages including the hyperlinks or references to the message stored in the bucket at box 720. In some embodiments, members of a secure list may identify or select a preferred contact path (e.g., a preferred E-mail address, telephone number, social network account or instant message user name) to which notices are to be sent.

At box 740, a request for the message is received at the secure storage facility, and at box 750, an identity of the requestor is determined. For example, each of the links to the message may include a unique URL associated with a specific recipient, and a selection of the URL may be mapped to a look-up table or other set of information and used to identify the requestor. Any technique for identifying a requestor may be utilized in accordance with the present disclosure. At box 760, whether the requestor has permissions to access the message and/or the bucket is determined. At box 770, if the requestor does not have permissions to access the message and/or the bucket, then at box 775, the requestor may be prompted for authentication, e.g., by any type or form of authentication procedure (e.g., a password-based authentication protocol, fingerprint recognition, biometric scanning or a multi-factor authentication procedure). If the requestor is determined to have permissions to access the message and/or the bucket at box 770, or if the requestor is authenticated at box 780, then the process advances to box 785, where the requestor is granted access to the message and/or the bucket, and the process ends. If the requestor is not authenticated at box 780, however, then the process advances to box 795, where the requestor is denied access to the message and/or the bucket, and the process ends.

Figure 8A:
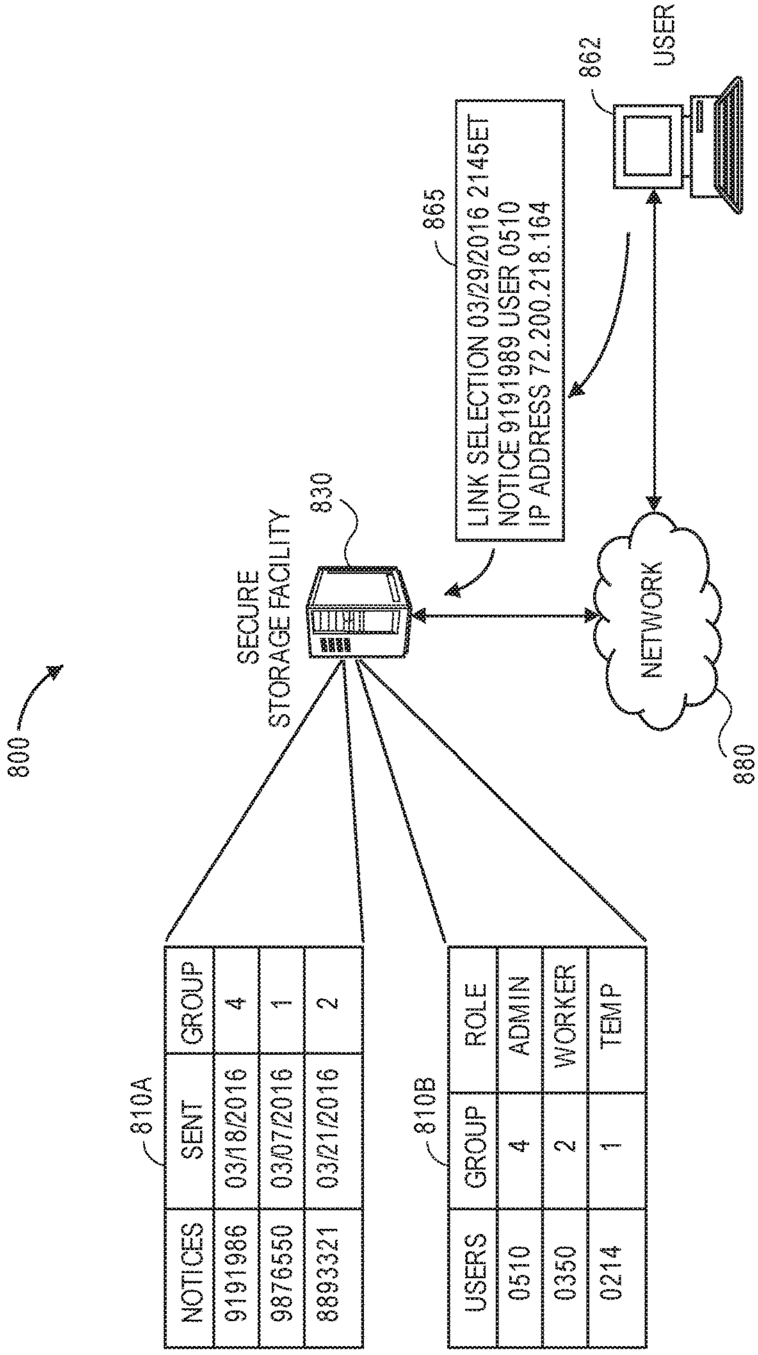
FIGS. 8A and 8B are views of aspects of one system for secure messaging in accordance with embodiments of the present disclosure.
Figure 8B:
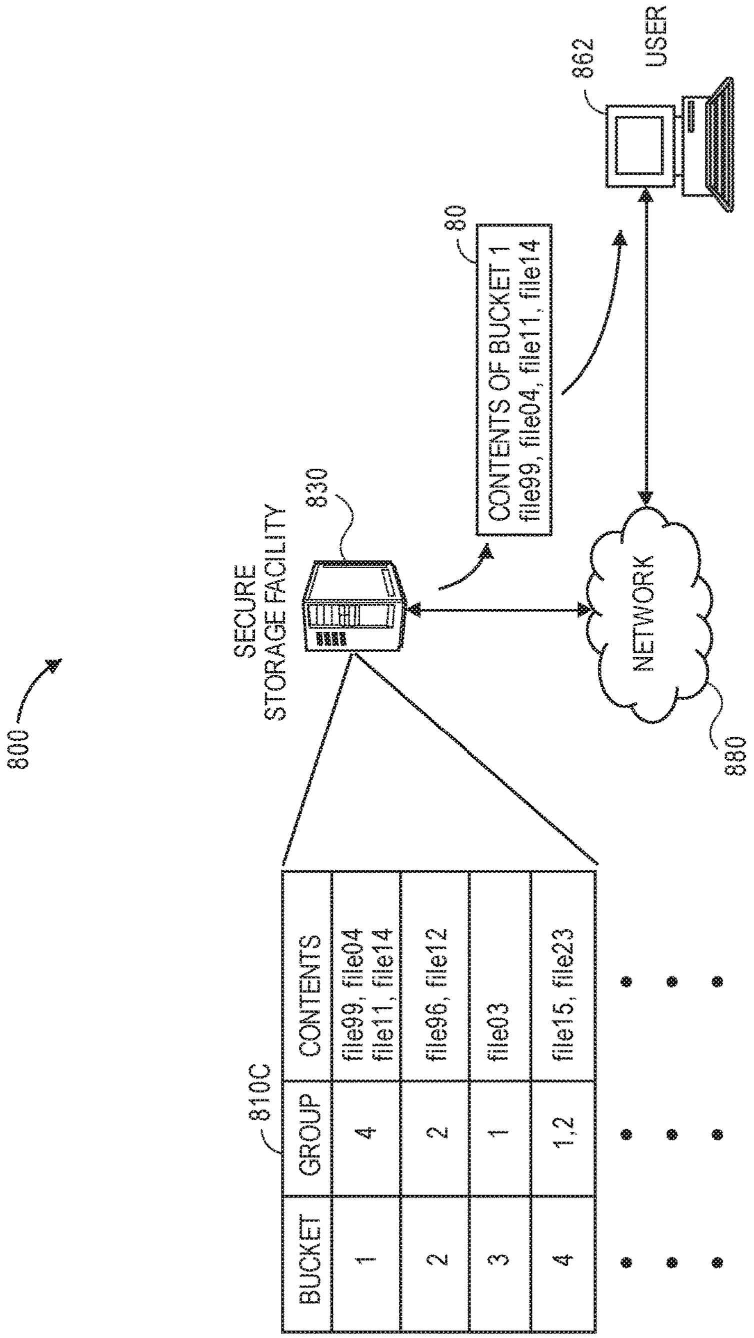

Referring to FIGS. 8A and 8B, views of aspects of one system 800 for secure messaging in accordance with embodiments of the present disclosure are shown. The system 800 includes a secure storage facility 830 and a computer device 862 operated by a user, connected to one another across a network 880, such as the Internet. Except where otherwise noted, reference numerals preceded by the number "8" in FIG. 8A or FIG. 8B refer to elements that are similar to elements having reference numerals preceded by the number "6" in FIG. 6, by the number "2" in FIG. 2A or FIG. 2B, by the number "1" shown in FIGS. 1A through 1E.

As is shown in FIG. 8A, the secure storage facility 830 includes data tables 810A, 810B. The data table 810A contains information regarding notices transmitted upon the storage of information in buckets within the secure storage facility 830, including numbers of such notices, dates on which such notices were transmitted, and groups (e.g., E-mail lists) of users to which such notices were transmitted. Alternatively, the data table 810 may further include information regarding a manner in which such notices were transmitted, e.g., via E-mail, SMS or MMS message, social network message or instant message, or any other relevant information or data regarding such notices. The data table 810B contains information regarding users, including the groups to which such users belong and their respective roles.

As is discussed above, when a notice including a link to a bucket (or folder) at a secure storage facility is provided to a user, and the user activates the link, information provided in response to the link may be used to authenticate the user, and to determine whether the user is authorized to view a message or other files stored in the bucket. As is shown in FIG. 8A, information regarding a selection 865 of a link included in a notice by a user of a computing device 862 is returned to the secure storage facility 830. The information regarding the selection 865 includes a date and time of the selection 865, and identifiers of the notice to which the selection 865 relates, the user to whom the notice was sent, an IP address of the computing device 862 at which the selection 865 was made. Alternatively, the information regarding the selection 865 may further include one or more cookies or trackers associated with the computing device 862, an identification of a browser or other client application at which the selection 865 was made. Based on the information regarding the selection 865, the secure storage facility 830 may then identify the group associated with the notice, and confirm that the user is a member of that group, before granting the user access to the bucket associated with the notice subject to one or more retrieval criteria.

As is shown in FIG. 8B, the secure storage facility 830 also includes a data table 810C identifying buckets, groups having access to the buckets, and the contents of the buckets. The buckets may contain any type of file including, but not limited to, electronic messages (e.g., E-mail), text files, images, audio files, video files, spreadsheets, records, presentations, or any other type of file. Once the selection 865 is received, from the user via the computing device 862, contents 80 of the bucket associated with the selection 865 may be returned to the computing device 862 over the network 880 directly, and not within an electronic mail message or other communication.

Those of ordinary skill in the pertinent art will recognize that users may be afforded varying levels of access or control over a secure bucket or folder, or the contents thereof. For example, an administrator may be granted the power to read files within the bucket or folder, to write files directly to the bucket or folder, to copy files within the bucket or folder, or to expressly forward links to such files to one or more other recipients, including but not limited to both members of a distribution list having access to the bucket or folder, or other users. Likewise, varying lesser levels of access to the bucket or folder, e.g., read-only access, may be granted to members or users who are not administrators, and such levels may be provided for limited times or durations, or in accordance with predetermined schedules.

As is discussed above, notices regarding the storage of one or more files (e.g., electronic messages) in a secure bucket or folder of a secure storage facility may be transmitted to intended recipients of the files, or those having access to the files or the bucket or folder, by a gateway module when the files are transferred to the bucket or folder for storage. Alternatively, a status of the bucket or folder may be tracked or determined, and a notice may be transmitted to those who are authorized to access the bucket or folder by the secure storage facility directly, via an E-mail server operating in association with the buckets or folders of the secure storage facility, e.g., according to an IMAP protocol, when the status of the bucket or folder changes.

Figure 9:
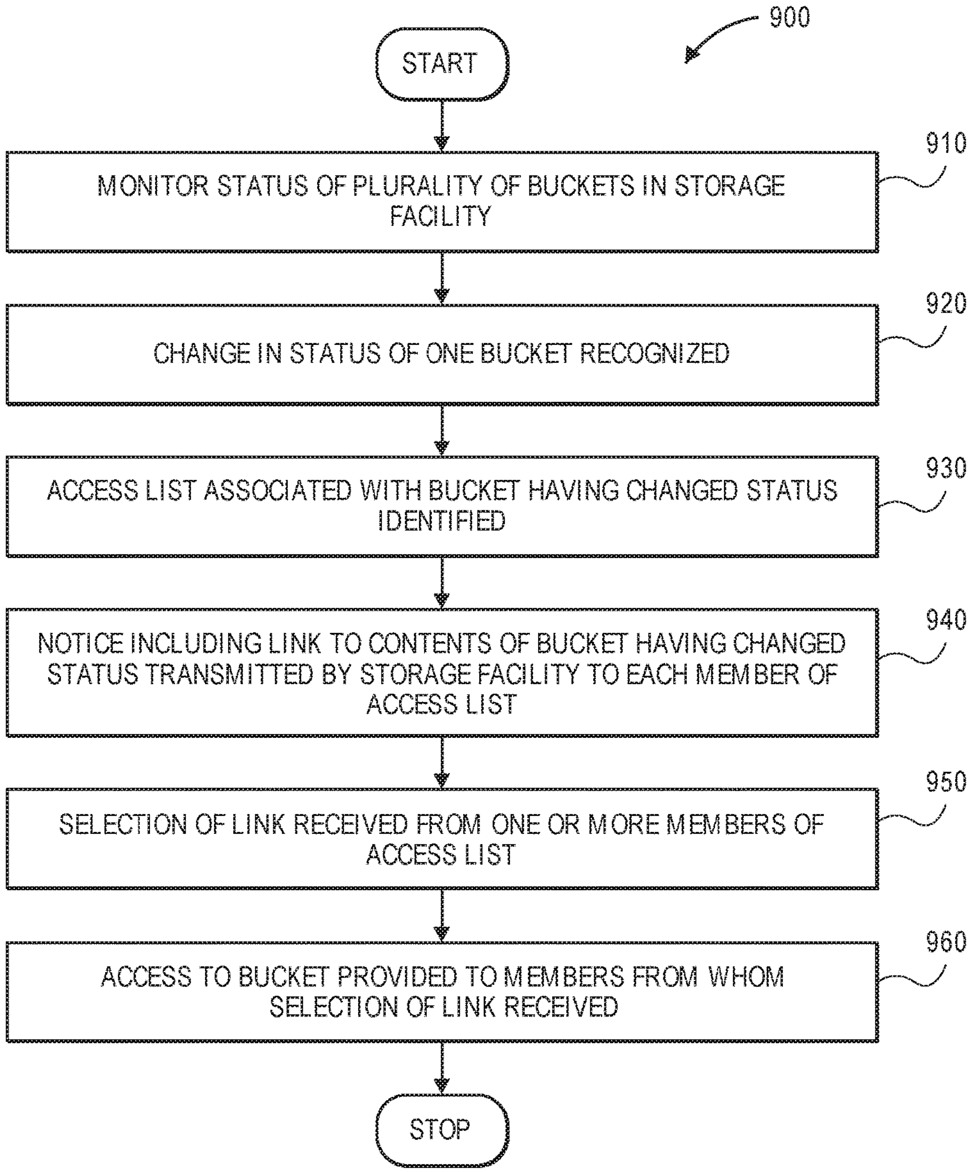
FIG. 9 is a flow chart of one process for secure messaging in accordance with embodiments of the present disclosure.

Referring to FIG. 9, a flow chart 900 representing one embodiment of a process for secure messaging in accordance with embodiments of the present disclosure is shown. At box 910, a status of a plurality of buckets in a storage facility is monitored. For example, when a file is added to a bucket, removed from the bucket, copied or modified, information regarding a change in the status of the bucket (e.g., a date and time associated with the change, or a user responsible for the change) may be determined and stored. At box 920, a change in the status of one bucket is recognized, and at box 930, an access list associated with the bucket having the changed status is identified. For example, a bucket may be associated with a distribution list (e.g., an E-mail list) and when a change in the status of the bucket is determined, contact information for each the members of the distribution list may be identified.

At box 940, a notice including a link to the contents of the bucket having a changed status is transmitted to each of the members of the access list. The link may refer to the bucket in its entirety, or to one or more files within the bucket that were added, deleted, copied or modified. At box 950, a selection of the link is received from one or more members of the access list. In some embodiments, information regarding the selection of the link may be used to identify and/or authenticate a member, and to confirm that the member is authorized to access the contents of the bucket. At box 960, access to the bucket is provided to members from whom the selection of the link was received, and the process ends.

Figure 10A:
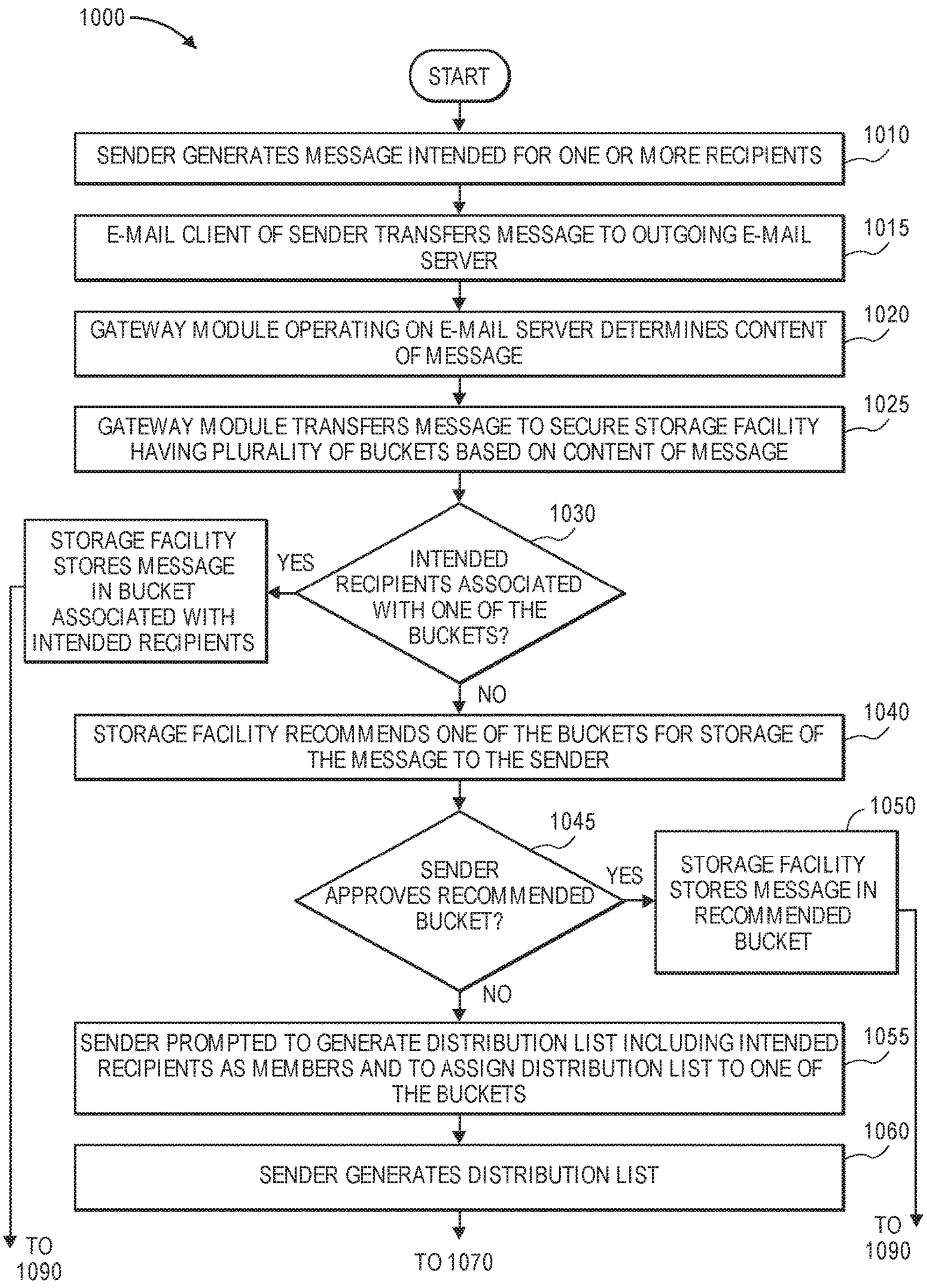
FIGS. 10A and 10B is a flow chart of one process for secure messaging in accordance with embodiments of the present disclosure.
Figure 10B:
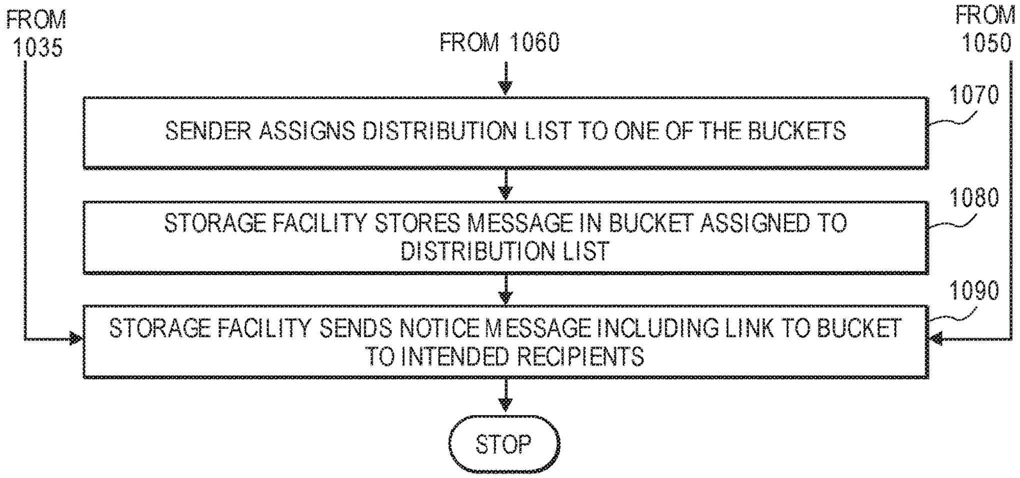

Referring to FIGS. 10A and 10B, a flow chart 1000 representing one embodiment of a process for secure messaging in accordance with embodiments of the present disclosure is shown. At box 1010, a sender generates a message intended for one or more recipients, e.g., on an E-mail client operating on a computer device, and at box 1015, the E-mail client of the sender transfers the message to an outgoing E-mail server. For example, the sender may use a mail application, a personal information management application or a browser to construct a message, and to transfer the application to a mail submission agent or other program or application operating on the E-mail server. Alternatively, those of ordinary skill in the pertinent arts will recognize that the message may be constructed and transmitted using an SMS or MMS text message application, RSS, a social network application or an instant messaging application, and transferred to one or more servers associated with text messaging, the social network or the instant messaging platform.

At box 1020, a gateway module operating on the E-mail server determines the content of the message, e.g., by interpreting the text and/or any images, audio files, video files or other multimedia expressed therein, and at box 1025, the gateway module transfers the message to a secure storage facility having a plurality of buckets for storage. For example, the gateway message may determine that the message is of a type or kind that is ordinarily stored in the secure storage facility, e.g., based on the content of the text or any relevant attributes of the multimedia, which may be consistent with storage criteria associated with one or more of the buckets in the storage facility.

At box 1030, the gateway module determines whether the intended recipients are associated with one of the buckets at the secure storage facility. For example, if the message is sent to an alias of a distribution list, and the distribution list is associated with a specific bucket, then the message may be deemed appropriate for storage in that bucket. If the message is not sent to an alias of a distribution list, but if each of the recipients is associated with a bucket (e.g., if the message is sent to individual E-mail addresses of the recipients who are members of a distribution list associated with a bucket, but is not sent to an alias of the distribution list), then the message may be deemed appropriate for storage in that bucket. If the intended recipients are associated with one of the buckets, then the process advances to box 1035, where the storage facility stores the message in the bucket associated with the intended recipients, and to box 1090, where the storage facility sends a notice message including a link to the bucket to the intended recipients. The notice message may be sent to contact paths (e.g., to E-mail addresses, telephone numbers via SMS or MMS message, social network accounts or instant messaging accounts) stored in a directory, or to contact paths specifically selected by the intended recipients for this purpose.

If the intended recipients of the message are not associated with one of the buckets, then the process advances to box 1040, where the storage facility recommends one of the buckets at the storage facility for storing the message to the sender. For example, the selected bucket may include files (e.g., messages) having one or more attributes in common with the message, such as a sender or content (e.g., sets of text or images), or may include files of the same format, files generated on the same or a similar computing device or application, or files of the same size, as the message. Information regarding the recommended bucket may be identified and displayed to the sender, e.g., on one or more user interfaces. At box 1045, if the sender approves the recommended bucket, then the process advances to box 1050, where the storage facility stores the message in the recommended bucket, and to box 1090, where the storage facility sends a notice message including a link to the bucket to the intended recipients.

If the sender does not approve the recommended bucket, then the process advances to box 1055, where the sender is prompted to generate a distribution list that includes each of the intended recipients of the message as members. The sender may be prompted via one or more user interfaces, which may present information identifying one or more attributes of the message which prompted the outgoing E-mail server to transfer the message to the secure storage facility, or any other relevant information. Additionally, the user interfaces may further include one or more interactive features that enable the sender to name members to the distribution list, such as the text box 424B and/or buttons 426B, 428B of FIG. 4B, or other interactive features that are similar in form or function.

At box 1060, the sender generates the distribution list, which may include the intended recipients of the message or any other users as members, and at box 1070, the sender assigns the distribution list to one of the buckets. For example, the sender may select the bucket using one or more user interfaces having interactive features such as the text box 424C or the buttons 426C, 428C, 435C of FIG. 4C, or other interactive features that are similar in form or function. The one of the buckets to which the distribution list is assigned may be selected at random. Alternatively, the sender may further specify one or more storage or filtering criteria that may be used to flag messages or other files for storage in the bucket in the future, or one or more retrieval criteria that must be met in order for one or more of the members of the list to securely retrieve messages or other files from the bucket in the future. At box 1080, the storage facility stores the message in the bucket assigned to the distribution list, and at box 1090, the storage facility sends a notice message including a link to the bucket to the intended recipients of the message, and the process ends.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, as used herein, the systems and methods of the present disclosure are not limited to use in connection with E-mail distribution lists, and may be utilized in connection with any type or form of electronic message distribution list. Some such lists may include, but are not limited to, SMS or MMS text message distribution lists, social network message distribution lists or instant messaging distribution lists. Furthermore, the systems and methods of the present disclosure do not necessarily require the use of a formally defined list. For example, when a sender prepares and sends an electronic message that is intended for delivery to a number of recipients, an outgoing server that receives the electronic message prior to delivery (e.g., an outgoing E-mail server) may analyze content of the electronic message to determine whether such content is suitable for storage in a predefined bucket, and review a list of the recipients to determine whether such recipients are authorized to receive the content of the electronic message. The content of the electronic message may then be stored in the predefined bucket, and a notice including a link to the bucket and/or the content therein may be provided to the authorized recipients. Additionally, those of ordinary skill in the pertinent arts will recognize that the terms "bucket" or "folder," when used herein to refer to the storage of messages and/or other files, are used interchangeably herein. Thus, references to a "bucket" or a "folder" may each refer to physical or virtual spaces for storing information or data files.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5A and 5B, 7, 9 or 10A and 10B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:

identifying a first electronic message intended for delivery to at least a first recipient by a gateway module operating in association with a first server;

determining, by the gateway module, at least a first permission level of the first recipient;

determining, by the gateway module, that the first recipient is authorized to receive the first electronic message based at least in part on the first permission level and at least a portion of the first electronic message;

comparing, by the gateway module, at least the portion of the first electronic message to at least one storage criterion;

determining, by the gateway module, that at least the portion of the first electronic message satisfies the at least one storage criterion;

in response to determining that at least the portion of the first electronic message satisfies the at least one storage criterion, identifying a first secure folder associated with the portion of the first electronic message by the gateway module, wherein the first secure folder is provided in association with the first server;

storing, by the gateway module, at least the portion of the first electronic message in the first secure folder;

generating, by the gateway module, a second electronic message intended for delivery to the first recipient, wherein the second electronic message comprises a hyperlink to at least a portion of the first secure folder;

causing, by the gateway module, the second electronic message to be transmitted over a network to the first recipient;

receiving, by the gateway module, information regarding a first selection of the hyperlink over the network, wherein the first selection of the hyperlink is received at a first computer device;

in response to the first selection of the hyperlink, determining that the first computer device is associated with the first recipient by the gateway module; and causing, by the gateway module, a first file comprising at least the portion of the first electronic message to be transmitted to the first computer device over the network via a first contact path associated with the first recipient.

2. The method of claim 1, wherein the at least one storage criterion is at least one of a plurality of keywords or at least one of a plurality of recipients, and wherein determining that at least the portion of the first electronic message satisfies the at least one storage criterion further comprises:

determining, by the gateway module, that the first electronic message includes at least one of the plurality of keywords; or determining, by the gateway module, that the first electronic message is intended for delivery to at least one of the plurality of recipients.

3. The method of claim 1, further comprising:

determining, by the gateway module, that the first recipient is not registered as authorized to receive the first electronic message;

identifying, by the gateway module, a sender of the first electronic message;

determining, by the gateway module, that the sender is permitted to authorize recipients to receive the first electronic message;

causing, by the gateway module, a display of a registration prompt on the first computer device;

receiving, by the gateway module, identifying information regarding the first recipient via the first computer device, wherein the identifying information regarding the first recipient comprises at least one of an IP address of the first computer device, a cookie residing on the first computer device or a credential of the first recipient, and wherein the credential is at least one of a user name, a password, an encryption key, a client certificate or a bearer token; and authorizing, by the gateway module, the first recipient to receive the first electronic message based at least in part on the identifying information regarding the first recipient.

4. The method of claim 1, wherein identifying the first electronic message intended for delivery to at least the first recipient further comprises:

receiving, by the gateway module, an electronic message addressed to an alias for a distribution list at a second server, wherein the first recipient is a member of the distribution list, and wherein the second server is not the first server.

5. The method of claim 4, further comprising:

receiving, by the gateway module via at least a first user interface over the network information regarding entries of contact paths for each of a plurality of members of the distribution list, wherein the first contact path is one of the contact paths, and wherein the first recipient is one of the plurality of members;

defining, by the gateway module, the distribution list based at least in part on the contact paths for each of the plurality of members of the distribution list; and storing, by the gateway module, information regarding the distribution list in at least one data store.

6. The method of claim 1, further comprising:

receiving, by the gateway module via at least a first user interface, information regarding a selection of the first secure folder; and associating, by the gateway module, the first secure folder with the portion of the first electronic message.

7. The method of claim 5, further comprising:

receiving, by the gateway module via at least the first user interface, information regarding a selection of the at least one storage criterion for the distribution list, wherein the at least one storage criterion is at least one of a predetermined keyword, an image, an audio file, a video file, an attachment, an identity of a sender, a domain name in a contact path of the sender, a domain name in a contact path of one of the plurality of members of the distribution list; and defining, by the gateway module, the distribution list based at least in part on the at least one storage criterion.

8. The method of claim 1, wherein the second electronic message is transmitted over the network to the first recipient via the first contact path according to at least one of an Internet Message Access Protocol, a Post Office Protocol 3, a Simple Mail Transfer Protocol, a social network messaging protocol or a Rich Site Summary protocol, and wherein the first file is transmitted to the first computer device via an encrypted connection.

9. The method of claim 1, further comprising:

in response to determining that the first computer device is associated with the first recipient, identifying a transformation preference of the first recipient, wherein the transformation preference specifies at least one of a language or a file format; and causing the first file to be transmitted to the first computer device, wherein the first file comprises the portion of the first electronic message in accordance with the transformation preference.

10. The method of claim 1, further comprising:

identifying, by the gateway module, a predetermined expiration time associated with at least one of the first electronic message or the first secure folder; and automatically deleting by the gateway module, the first electronic message from the first secure folder not earlier than the predetermined expiration time.

11. The method of claim 1, wherein the second electronic message is transmitted to the first recipient by way of a second contact path associated with the first recipient, wherein the first contact path is a first one of an E-mail address of the first recipient, a user name of the first recipient, a telephone number of the first recipient or a social network account of the first recipient, and wherein the second contact path is a second one of the E-mail address of the first recipient, the user name of the first recipient, the telephone number of the first recipient or the social network account of the first recipient.

* * * * *